(12) United States Patent
Honea et al.

(10) Patent No.: US 7,876,498 B1
(45) Date of Patent: Jan. 25, 2011

(54) PULSE-ENERGY-STABILIZATION APPROACH AND FIRST-PULSE-SUPPRESSION METHOD USING FIBER AMPLIFIER

(75) Inventors: Eric C. Honea, Seattle, WA (US); Roy D. Mead, Edmonds, WA (US); John D. Minelly, Bothell, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 307 days.

(21) Appl. No.: 12/054,375

(22) Filed: Mar. 24, 2008

Related U.S. Application Data

(60) Provisional application No. 60/896,498, filed on Mar. 23, 2007.

(51) Int. Cl.
*H04B 10/17* (2006.01)
*H01S 3/00* (2006.01)

(52) U.S. Cl. .............................. 359/341.41; 359/341.43

(58) Field of Classification Search ............ 359/341.41, 359/341.43
See application file for complete search history.

(56) References Cited

U.S. PATENT DOCUMENTS

| | | | |
|---|---|---|---|
| 4,904,043 A * | 2/1990 | Schweizer | 398/42 |
| 5,088,095 A | 2/1992 | Zirngibl | |
| 5,982,790 A | 11/1999 | Grossman et al. | |
| 5,991,068 A * | 11/1999 | Massicott et al. | 359/337 |
| 6,064,514 A | 5/2000 | Aoki et al. | |
| 6,356,385 B1 * | 3/2002 | Digonnet et al. | 359/337 |
| 6,424,456 B1 * | 7/2002 | Lee et al. | 359/337 |
| 6,437,906 B1 * | 8/2002 | Di Pasquale et al. | 359/337.2 |
| 6,788,713 B1 * | 9/2004 | Stepanov et al. | 372/6 |
| 6,847,758 B1 * | 1/2005 | Watanabe | 385/27 |
| 7,027,199 B2 | 4/2006 | Johnson | |
| 7,254,147 B2 | 8/2007 | Ukita et al. | |
| 7,313,155 B1 | 12/2007 | Mu et al. | |
| 2007/0035810 A1 | 2/2007 | Henderson | |

OTHER PUBLICATIONS

Yahel et al. "Transient Analysis of Short, High-Concentration, Gain-Clamped Er3+-Yb3+ Codoped Fiber Amplifiers", Journal of Lightwave Technology, vol. 24, No. 5, pp. 2190-2198 (May 2006).*

* cited by examiner

*Primary Examiner*—Eric Bolda
(74) *Attorney, Agent, or Firm*—Charles A. Lemaire; Jonathan M. Rixen; Lemaire Patent Law Firm, P.L.L.C.

(57) ABSTRACT

In some embodiments, the present invention provides an apparatus and process wherein excess stored optical energy is removed from one or more stages in a fiber-amplifier, in order to stabilize the gain and obtain a constant level of energy per pulse. In some embodiments, a method of the invention includes providing a gain fiber, optically pumping the gain fiber using pump light, amplifying seed-signal pulses having a signal wavelength using the gain fiber to obtain amplified output pulses, and automatically limiting a gain of the gain fiber. In some embodiments, an apparatus of the invention includes a gain fiber, a source of pump light coupled to the gain fiber, a source of seed-signal pulses having a signal wavelength coupled to the gain fiber, wherein the gain fiber outputs amplified signal pulses, and an automatic-gain-control mechanism configured to limit gain of the gain fiber.

39 Claims, 13 Drawing Sheets

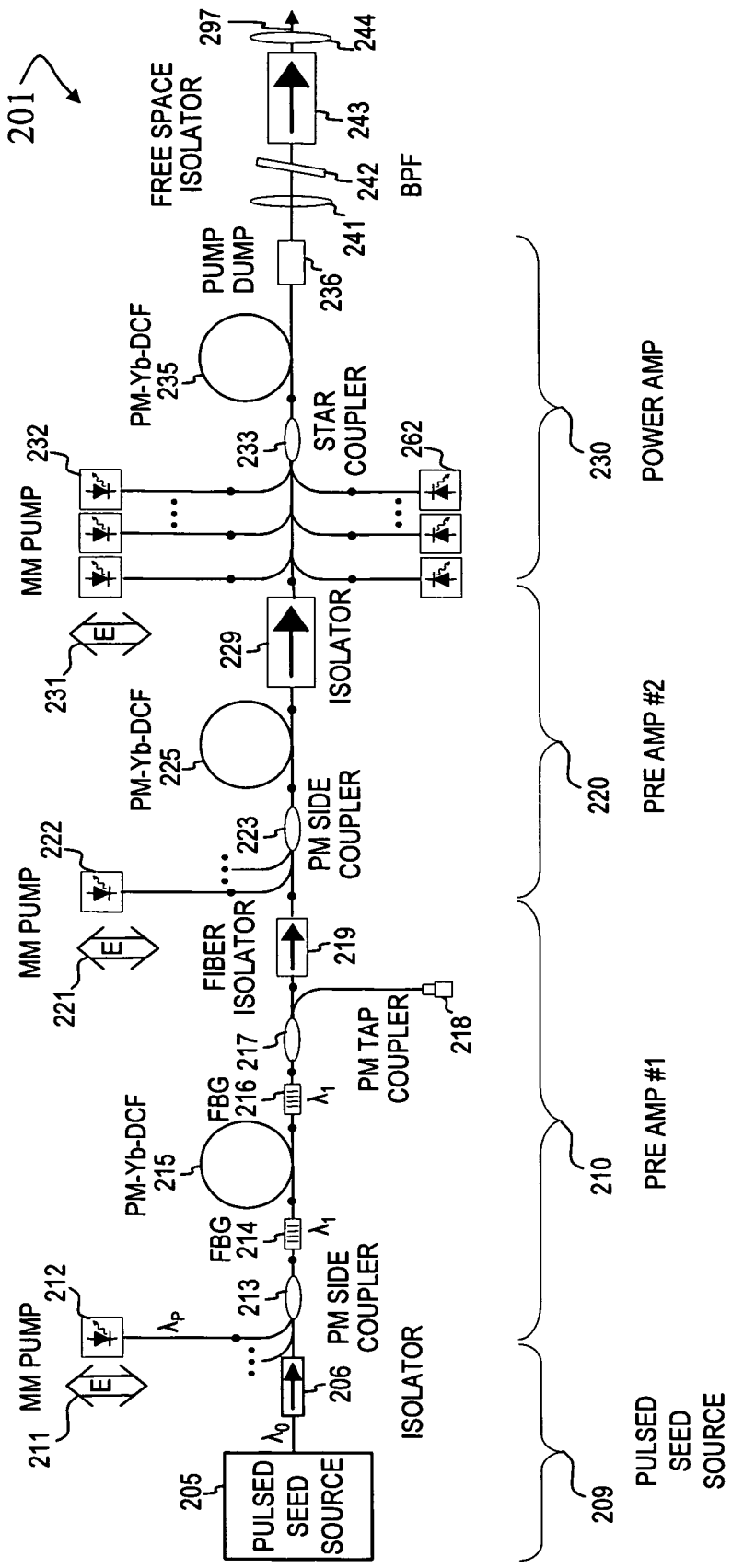

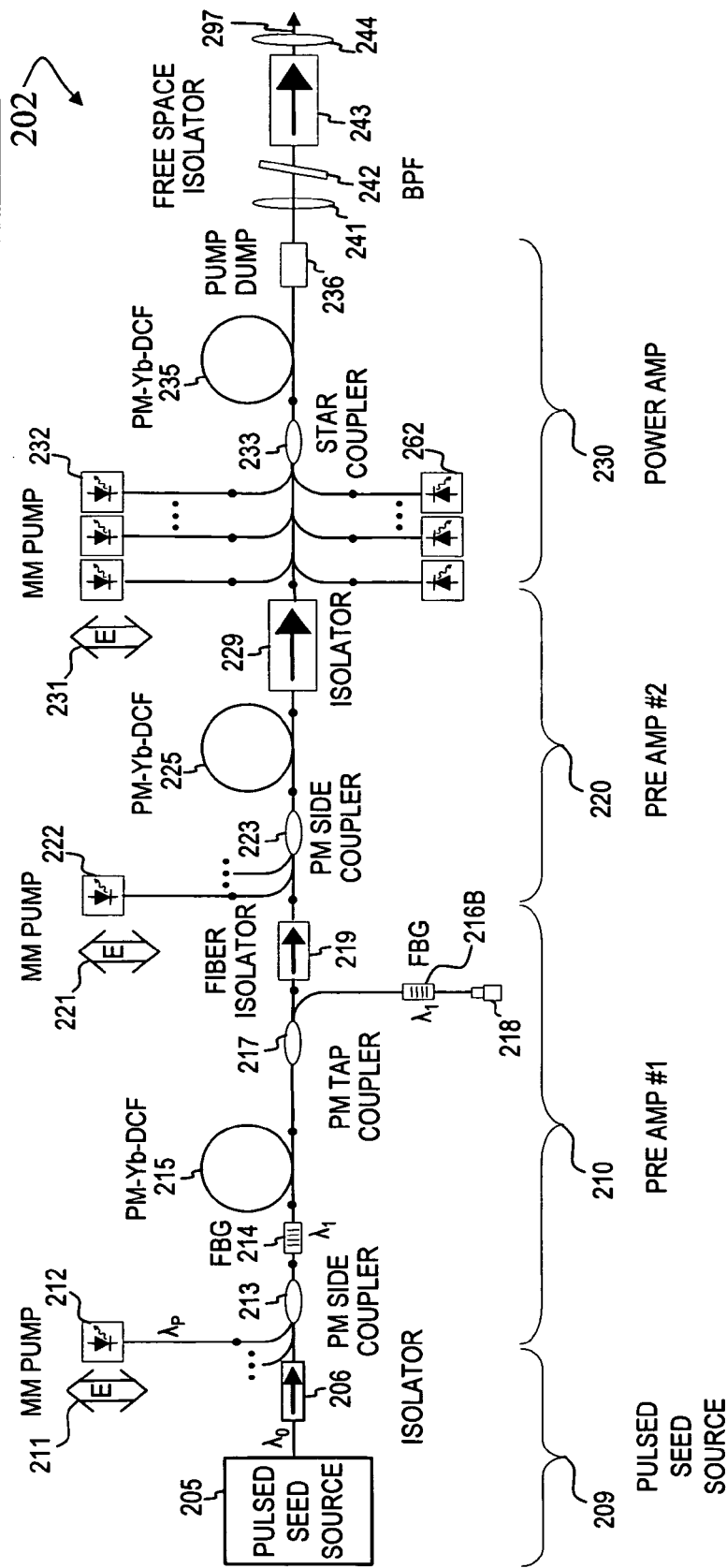
FIG. 2B   AUTOMATIC GAIN CONTROL (OPTICAL CLAMPING) USING FBGs IN PREAMP

PULSE-ENERGY-STABILIZATION APPROACH AND FIRST-PULSE-SUPPRESSION METHOD USING FIBER AMPLIFIER

CROSS-REFERENCE TO RELATED APPLICATIONS

This application claims benefit under 35 U.S.C. §119(e) of U.S. Provisional Patent Application 60/896,498 filed on Mar. 23, 2007, titled "PULSE-ENERGY STABILIZATION APPROACH AND FIRST-PULSE-SUPPRESSION METHOD USING FIBER AMPLIFIER," which is incorporated herein by reference in its entirety.

This invention is related to U.S. Patent Provisional Application Ser. No. 60/896,265 titled "HIGH-POWER, PULSED RING FIBER OSCILLATOR" filed Mar. 21, 2007, U.S. patent application Ser. No. 12/053,551 titled "HIGH-POWER, PULSED RING FIBER OSCILLATOR AND METHOD" filed Mar. 21, 2008, U.S. Patent Provisional Application Ser. No. 60/699,894 titled "APPARATUS AND METHOD FOR GENERATING CONTROLLED-LINEWIDTH LASER-SEED-SIGNALS FOR HIGH-POWERED FIBER-LASER AMPLIFIER" filed Jul. 15, 2005, U.S. patent application Ser. No. 11/488,910 (now U.S. Pat. No. 7,539,231) titled "APPARATUS AND METHOD FOR GENERATING CONTROLLED-LINEWIDTH LASER-SEED-SIGNALS FOR HIGH-POWERED FIBER-LASER AMPLIFIER SYSTEMS" filed Jul. 17, 2006, U.S. patent application Ser. No. 11/623,056 (now U.S. Pat. No. 7,545,836) titled "APPARATUS AND METHOD FOR TEMPORALLY SHAPING DRIVE CURRENT TO SEED-SIGNAL-LASER-DIODES FOR HIGH-POWERED FIBER-LASER AMPLIFIER SYSTEM" filed Jan. 12, 2007, U.S. patent application Ser. No. 11/420,729 (now U.S. Pat. No. 7,391,561) titled "FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD" filed May 26, 2006, U.S. patent application Ser. No. 11/257,793 (now U.S. Pat. No. 7,736,382) filed Oct. 24, 2005 and titled "APPARATUS AND METHOD FOR OPTICAL STIMULATION OF NERVES AND OTHER ANIMAL TISSUE", U.S. patent application Ser. No. 11/536,639 filed Sep. 28, 2006 and titled "MINIATURE APPARATUS AND METHOD FOR OPTICAL STIMULATION OF NERVES AND OTHER ANIMAL TISSUE", U.S. patent application Ser. No. 11/948,912 filed Nov. 30, 2007 and titled "APPARATUS AND METHOD FOR CHARACTERIZING OPTICAL SOURCES USED WITH HUMAN AND ANIMAL TISSUES", U.S. patent application Ser. No. 11/536,642 filed Sep. 28, 2006 and titled "APPARATUS AND METHOD FOR STIMULATION OF NERVES AND AUTOMATED CONTROL OF SURGICAL INSTRUMENTS", U.S. patent application Ser. No. 11/971,874 filed Jan. 9, 2008 and titled "METHOD AND VESTIBULAR IMPLANT USING OPTICAL STIMULATION OF NERVES", U.S. patent application Ser. No. 11/484,358 (now U.S. Pat. No. 7,620,077) filed Jul. 10, 2006 and titled "APPARATUS AND METHOD FOR PUMPING AND OPERATING OPTICAL PARAMETRIC OSCILLATORS USING DFB FIBER LASERS", and U.S. patent application Ser. No. 12/077,083 filed Mar. 13, 2008 and titled "FRACTIONAL PHOTOLYSIS USING SUB-MICROSECOND PULSED FIBER LASER(S)", which are all incorporated herein in their entirety by reference.

FIELD OF THE INVENTION

The invention relates generally to operation of pulsed-laser systems, and more particularly to stabilization of pulse energy in pulsed-fiber-laser systems and/or clamping and limiting of the peak power of the first pulse in a series of pulses fed through one or more pre-pumped fiber amplifiers.

BACKGROUND OF THE INVENTION

Optical fiber amplifiers are typically optically pumped. In a gain fiber, the core of the fiber is typically doped with one or more active species (e.g., rare-earth ion dopants). Typically, when one species is used (e.g., ytterbium), those ions absorb light of the pump wavelength and use the energy to amplify light of a signal wavelength by stimulated emission. Typically, when two species are used (e.g., erbium and ytterbium), the ions of one species absorb light of the pump wavelength and transfer that energy to the second species, and the second species uses the transferred energy to amplify light of a signal wavelength by stimulated emission.

U.S. Pat. No. 5,088,095 to Martin Zirngibl titled "GAIN STABILIZED FIBER AMPLIFIER" is incorporated herein by reference. This patent describes an optical fiber doped with a rare earth element and coupled to be pumped with a laser is coupled to an optical feedback loop. The feedback loop couples the output signal of the fiber amplifier to the input of the fiber amplifier. A narrow bandwidth filter coupled to the feedback loop allows a selected wavelength of the amplified spontaneous emission to pass from the output of the fiber amplifier to the input of the fiber amplifier. The feedback signal has a wavelength which is different from that of the pump signal and the wavelengths of the signals to be amplified. In operation, when bursts of optical signals from at least two discrete word or frequency division multiplexed channels are amplified in the fiber amplifier, the undesired fluctuations of gain of the output signals normally due to transient saturation of the erbium-doped filter amplifier are substantially eliminated.

U.S. Pat. No. 5,982,790 to William Mark Grossman et al. titled "SYSTEM FOR REDUCING PULSE-TO-PULSE ENERGY VARIATION IN A PULSED LASER" is incorporated herein by reference. This patent describes a system and method for reducing pulse-to-pulse energy and peak power variation in various types of pulsed lasers, and in Q-switched lasers in particular. The system of invention has a laser cavity with a lasing medium pumped by a pumping device for delivering to the medium a pumping energy $E_{pump}$. The system further includes a detection device and circuitry for determining the pulse magnitudes $M_i$ of laser pulses i, such as peak pulse amplitudes $A_i$, pulse energies pulse widths $W_i$ or other pulse metrics. According to the method of invention, a feedback mechanism which is in communication with the pumping device ensures pulse-to-pulse stability by increasing the pumping energy $E_{pump}$ when pulse magnitude $M_i$ of laser pulse i exceeds a mean pulse magnitude [M] and decreasing the pumping energy $E_{pump}$ when $M_i$ is less than [M]. Alternatively, the feedback mechanism is in communication with the switching device which controls that variable loss factor of the Q-switch. Pulse-to-pulse peak and energy stability is achieved by decreasing the variable loss factor when $M_i$ of pulse i exceeds the mean [M] and increasing the variable loss factor when $M_i$ of laser pulse i is less than [M].

U.S. Pat. No. 6,064,514 to Yasuhiro Aoki et al. titled "OPTICAL SURGE PREVENTING METHOD AND SYSTEM FOR USE WITH OR IN A RARE EARTH DOPED FIBER CIRCUIT" is incorporated herein by reference. This patent describes optical surge preventing systems and methods for rare earth-doped optical fiber amplifiers. The systems are so arranged as to cause any signal existing in a doped fiber section so as not to over excite the rare earth elements in the doped fiber section. In one embodiment, a background signal light with such a wavelength as to cause induced emission in the doped fiber section is always coupled into the doped fiber section regardless of whether a message signal light exists or not. The background signal light may be generated by any suitable light source or a light spontaneously emitted from either end of the doped fiber section. In another embodiment, a dummy signal light is coupled into the doped fiber section if the level of the message signal light becomes less than a predetermined value. Coupling of the background signal light or the dummy signal light into the doped fiber section may be done from either of the message signal input and output sides.

U.S. Pat. No. 7,027,199 to Jay Johnson titled "AOM MODULATION TECHNIQUES FOR FACILITATING PULSE-TO-PULSE ENERGY STABILITY IN LASER SYSTEMS" is incorporated herein by reference. This patent describes digital control of frequency and/or amplitude modulation techniques of an intracavity and/or extracavity AOM (60) facilitate substantially full extinction of a laser beam (90) to prevent unwanted laser energy from impinging a workpiece (80); facilitate laser pulse amplitude stability through closed-loop control of pulse-to-pulse laser energy; facilitate beam-positioning control including, but not limited to, closed-loop control for applications such as alignment error correction, beam walk rectification, or tertiary positioning; and facilitate employment of more than one transducer on an AOM (60) to perform any of the above-listed applications.

U.S. Pat. No. 7,254,147 to Katsuichi Ukita titled "LASER CONTROL METHOD LASER APPARATUS LASER TREATMENT METHOD USED FOR THE SAME LASER TREATMENT APPARATUS" is incorporated herein by reference. This patent describes a laser controlling method that can generate laser of stable laser pulses, and eliminate useless time from a machining procedure. The method uses a gain medium and a Q-switch, and emits exciting light to the gain medium, thereby setting the Q-switch in a continuous oscillation mode, and prepares a given Q-switch pause time before a laser pulse is generated. When the continuous oscillation is kept going longer than a given time, the control method sets a Q-switch pause time for obtaining a first laser pulse to be different from a Q-switch pause time for obtaining a second laser pulse and onward.

U.S. Pat. No. 7,313,155 to Liyue Mu et al. titled "HIGH POWER Q-SWITCHED LASER FOR SOFT TISSUE ABLATION" is incorporated herein by reference. This patent describes a high power Q-switched, intracavity frequency-doubled laser for laser ablation of soft tissue. Operating a high power Q-switched laser in a frequent on-off mode is highly desirable for laser prostatectomy. Giant first pulse may occur when a Q-switched laser is switched from laser-ready mode to pulse-on mode due to sudden depletion of stored energy in the gain medium. Such a giant first pulse may cause power damage of intracavity optics. Besides, temperature shock induced by sudden onset of a high power pulse train may cause optical damage on surface coating of intracavity optics. The present invention contemplates to suppress these giant first pulses and temperature shocks through pre-lasing and ramping profile of laser parameters. Reliable and frequent on-off operation of a diode-pumped, Q-switched, frequency-doubled Nd:YAG laser is demonstrated for output power up to 100 W.

U.S. patent application Ser. No. 11/484,358 filed Jul. 10, 2006 by Angus J. Henderson and titled "APPARATUS AND METHOD FOR PUMPING AND OPERATING OPTICAL PARAMETRIC OSCILLATORS USING DFB FIBER LASERS" is incorporated herein by reference. This application describes an optical parametric oscillator (OPO) that efficiently converts a near-infrared laser beam to tunable mid-infrared wavelength output. In some embodiments, the OPO includes an optical resonator containing a nonlinear crystal, such as periodically-poled lithium niobate. The OPO is pumped by a continuous-wave fiber-laser source having a low-power oscillator and a high-power amplifier, or using just a power oscillator. The fiber oscillator produces a single-frequency output defined by a distributed-feedback (DFB) structure of the fiber. The DFB-fiber-laser output is amplified to a pump level consistent with exceeding an oscillation threshold in the OPO in which only one of two generated waves ("signal" and "idler") is resonant within the optical cavity. This pump source provides the capability to tune the DFB fiber laser by straining the fiber (using an attached piezoelectric element or by other means) that allows the OPO to be continuously tuned over substantial ranges, enabling rapid, wide continuous tuning of the OPO output frequency or frequencies.

As used herein, the optical signal (also called the signal, the seed signal, or the seed) is light of the signal wavelength being amplified or of the laser output (and may or may not be modulated with information), and the optical pump (also called the pump) is light of the pump wavelength used to input optical energy and power to the optical amplifier or laser by exciting an active species or dopant. As used herein, absorbing/absorbent material and/or dopants each mean a species (such as rare-earth ions) that are added to at least a portion of an optical fiber to absorb at least one wavelength without substantial re-radiation of stimulated emission. As used herein, active or signal dopants each mean one or more species (such as rare-earth ions) that are added to at least a portion of an optical fiber to absorb at least a pump wavelength and to provide stimulated-emission amplification of a signal wavelength (i.e., a species that absorbs pump light and amplifies signal light).

When amplifying fibers are used to amplify pulsed signal light, the pump light is sometimes fed into the fiber for a period of time before the signal pulse (e.g., in some embodiments, the pump laser is left on continuously), and the optical pump energy at a pump wavelength is absorbed by the active species such that between pulses, it builds up over time in the fiber. This stored energy is released by amplifying a seed pulse of the signal wavelength. This can lead to short signal pulses of several kilowatts peak power even if the continuous-wave (CW) pump power is less than 10 watts.

However, such systems are susceptible to having different amounts of gain and power in their output pulses. Particularly for systems that utilize nonlinear frequency conversion to generate alternate wavelengths, the pulse stability can deteriorate significantly due to the nonlinearities of the frequency-conversion process. What are needed are improved methods and apparatus for stabilizing the gain and the per-pulse power in pulsed-laser systems.

SUMMARY OF THE INVENTION

In some embodiments, the present invention provides an apparatus and process wherein excess pump power is removed from one or more stages in a fiber-amplifier chain, in order to stabilize (clamp) the gain and obtain a constant level of power per pulse. In some embodiments, a low-feedback high-threshold continuous-wave (CW) lasing cavity is formed in the amplifier chain, such that when no pulses are being amplified, once the stored pump energy reaches the threshold for lasing of the CW high-threshold lasing cavity, it will lase and "bleed off" any additional energy. Once seed pulses are provided and use additional stored energy from the fiber, the gain in the cavity will drop below threshold and no power will be used in the CW lasing cavity, but rather, all the stored energy will be used to amplify pulses. This prevents "too much" energy being available for the first pulse after a gap in time with no pulses.

Many applications require careful control of the power or pulse energy out of a laser system, including situations where the time between pulses is varied and/or the laser is turned on after a period of not firing. In particular, for many solid-state crystal and fiber lasers the energy-storage time before a given pulse is longer than the time between subsequent pulses, so the first pulse or sequence of pulses can produce much higher energy than the pulses in steady-state operation. For Q-switched lasers, there are methods to control the properties of the Q-switch to provide "first pulse suppression" or other techniques to manage this pulse energy. The techniques of the present invention are particularly well suited to optical-amplifier chains wherein at least one of the amplifiers is a fiber laser.

When the time between pulses varies, the amount of accumulated pump energy in the gain fiber varies, since when there is little time between pulses, only a proportionally small amount of energy is stored in the active species, but when there is longer time between pulses, a proportionally larger amount of energy is stored in the active species. The different energy levels resulting from different between-pulse periods leads to different amounts of gain and different amounts of power per pulse, wherein the first pulse (or the first several pulses, if the first pulse does not completely deplete the excess stored energy) after a longer period with no pulses will have much more gain and thus more output power than subsequent pulses that follow in quick succession.

The methods of the present invention include various methods to "bleed off" excess stored energy when the laser is not pulsed or is pulsed infrequently, such that when rapid pulsing resumes, the stored pump energy is at a value that is closer to the steady-state energy. In some embodiments, the methods include injecting a CW (continuous wave) or pulsed signal through the amplifier chain that can be rejected after the final amplifier. The methods include one or more of the following:

1) In some embodiments, for a frequency-converted pulsed-laser system where high peak optical input power is required in order to produce efficient nonlinear optical conversion in the non-linear crystal(s), a CW signal is injected at the beginning or at an intermediate point in the optical-amplifier chain such that the level of inversion (i.e., the amount of stored energy in the active species) of one or more amplifiers is limited, thereby limiting the gain or energy available to amplify the subsequent pulse(s), but wherein the CW signal between the signal pulses, when output, is of such a low power that it does not result in significant wavelength conversion to the desired output wavelength in the nonlinear optical crystals, due to the limited power in the CW signal;

2) In some embodiments, in a laser system producing polarized output, a background signal of a "wrong" polarization (i.e., a signal having a polarization different than the desired signal pulses) is injected at the beginning or at an intermediate point in the amplifier chain which is then rejected by a polarizer;

3) In some embodiments, in lasers where the operating wavelength is limited to a small fraction of the gain bandwidth, such as a Yb (ytterbium)) fiber laser with 30-60 nm (nanometers) of gain bandwidth (ytterbium can have a gain bandwidth that goes from about 1030 nm to 1100 nm (or even starting as low as 975 nm if pumped hard enough)) but operating at a few nm or less of linewidth for the signal amplification, an alternate "off-signal" wavelength (i.e., one inside the species gain bandwidth but outside the amplifier's bandwidth as configured) can be injected at the beginning or at an intermediate point in the amplifier chain, which then limits the level of inversion in one or more of the amplifiers, and, in some embodiments, the alternate "off-signal" wavelength is rejected later in the beam path using a wavelength-sensitive filter, such as a dichroic or bandpass filter; e.g., at the output;

4) In some embodiments, in lasers using one or more fiber amplifiers, the off-wavelength signal is generated by using partial reflectors to allow self-lasing of that amplifier chain if a pulsed signal is not present (e.g., in some embodiments, fiber Bragg gratings (FBGs) configured at an "off-signal" wavelength are placed at both ends of one or more stages, such that those stages will begin to lase at the "off-signal" wavelength once the gain within those stages exceeds to losses of the "off-signal" wavelength leaking out the FBGs, but wherein the FBGs are substantially transparent to the signal wavelength of the signal pulses) in order to saturate the gain below the self-lasing threshold. In cases where the relaxation oscillations of such an oscillator produce transients in the population inversion and gain, multiple wavelengths with different self-lasing thresholds can be used to damp out the relaxation oscillations, similar to the approaches developed for Erbium-doped fiber amplifiers (EDFA) used in telecommunication applications.

BRIEF DESCRIPTION OF THE DRAWINGS

FIG. 2A is a block diagram of automatic-gain-control fiber amplifier chain 201.

FIG. 2B is a block diagram of automatic-gain-control fiber amplifier chain 202.

DETAILED DESCRIPTION

Although the following detailed description contains many specifics for the purpose of illustration, a person of ordinary skill in the art will appreciate that many variations and alterations to the following details are within the scope of the invention. Accordingly, the following preferred embodiments of the invention is set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component that appears in multiple figures. Signals and connections may be referred to by the same reference number or label, and the actual meaning will be clear from its use in the context of the description.

Figure 1A:
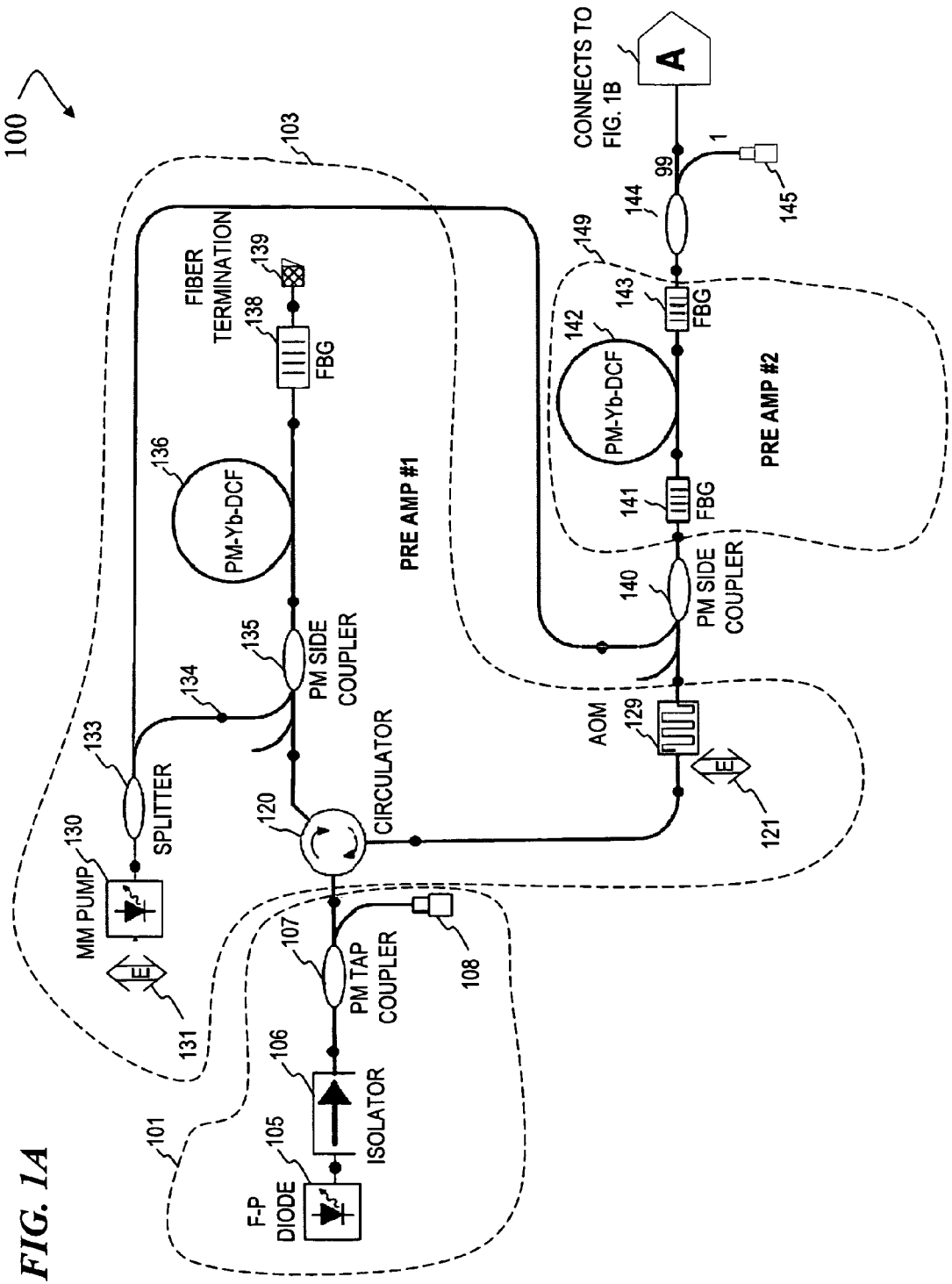
FIG. 1A is a block diagram of a first portion of a fiber amplifier chain 100.
Figure 1B:
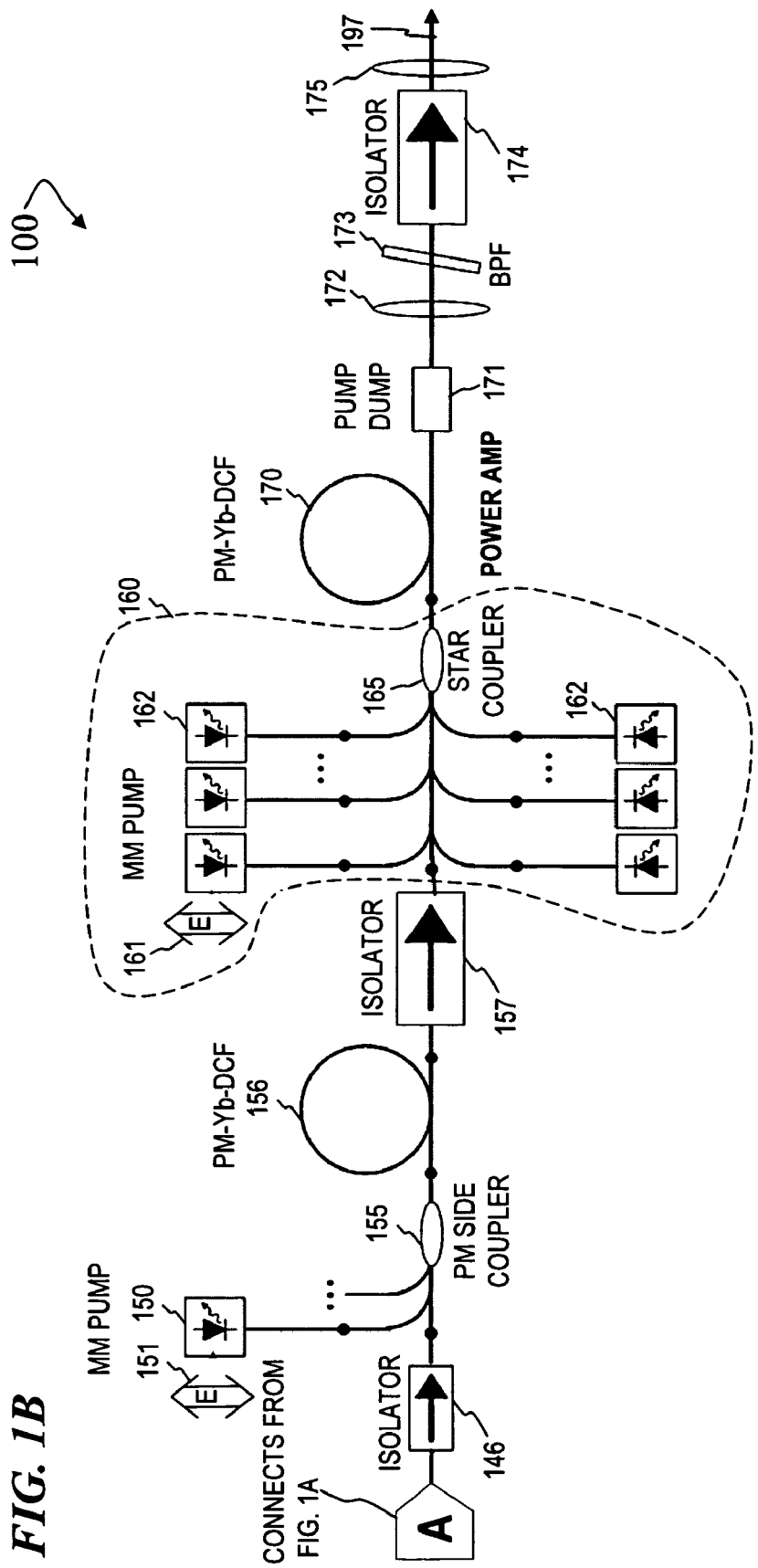
FIG. 1B is a block diagram of a second portion of the fiber amplifier chain 100.

FIG. 1A and FIG. 1B together form a FIG. 1, which is a schematic diagram of an improved automatic-gain-control (AGC) fiber amplifier 100. In some embodiments, AGC fiber amplifier 100 includes a double-pass pre-amplifier 103 using FBG filter 138 with circulator 120. In some embodiments, pulsed seed source 105 includes a laser diode (e.g., in some embodiments, a 500-mW-peak, 1060-nm Fabry-Perot (F-P) laser diode; one source for such Fabry-Perot Diode Lasers is Sacher Lasertechnik, LLC, 5765 Equador Way, Buena Park, Calif. 90620 (USA), information at www.sacher-laser.com/FP_Info.php) followed by a one-way dual-stage isolator 106 (in some embodiments, an isolator that operates in a range of about 1060 nm to 1080 nm) to prevent signals passing back (leftwards as shown in the Figure) to seed source 105, and a fiber tap coupler 107 that bleeds off 1 percent of the signal to a monitoring detector 108 (which is used to monitor and/or detect the seed pulses).

In some embodiments, the output (the right-hand output as shown in the Figure) of coupler 107 (99 percent of the signal from isolator 106) is passed into circulator 120 (which, in some embodiments, is a fairly lossy component). Some of the signal then passes from circulator 120 through polarization-maintaining (PM) fiber side coupler 135, which injects this signal into the core of gain fiber 136 (in some embodiments, a ytterbium-doped DCF having a 125-micron-diameter fiber and a 6-micron-diameter core), which passes the signal to FBG filter 138. Side coupler 135 also receives pump light from laser diode 130 (e.g., a multi-mode (MM) pump-laser diode) entering the inner cladding of double-clad gain fiber (DCF) 136 (e.g., in some embodiments, pump-laser diode 130 is a 6.5-W, 915-nm laser-diode device controlled by electronic drivers/circuit 131) followed by a splitter 133, and a fusion splice 134 into polarization-maintaining (PM) fiber side coupler 135. Any light exiting to the right of FBG 138 is dumped out 8-degree-angle cleaved fiber termination 139 (wherein the 8-degree cleave ensures that any reflected light is not within the fiber core; one source for 8-degree fiber terminators is Gould Fiber Optics, 1121 Benfield Blvd., Suites J-P Millersville, Md. 21108 (USA); information at www.gould-fo.com/gould/main.aspx). The pump light and signal light enter Yb-doped PM amplifying DCF 136 (e.g., a 125-micron double-clad fiber having a 6-micron core), is reflected by PM FBG 138 (which, in some embodiments, reflects at 1060 nm at a narrow linewidth) then passes again through PM amplifying fiber 136 and again is amplified by Yb-doped PM amplifying fiber 136. This reflected 1060-nm light goes back to circulator 120.

The main output of circulator 120 of FIG. 1A then passes downward in the figure to the next stage, starting with amplitude modulator 129 (which, in some embodiments, includes an acousto-optical modulator (AOM) or electro-optic modulator (EOM), that is controlled by electronic circuit 121 and synchronized with the pulses from seed source 105 to reduce any amplified spontaneous emission (ASE) from gain fiber 136, and/or to select a subset of the pulses generated by F-P laser diode 105, each of which has been amplified to a substantially constant amplitude and shape by the optical stages 101 and 103) and into a core into PM side coupler 140 (in some embodiments, a double-clad side coupler that inserts the signal light from acousto-optic modulator 129 onto the PM core of its output fiber and pump light from splitter 133 into the inner cladding of its output fiber). The pulsed signal then passes through FBG 141 into gain fiber 142 (in some embodiments, a PM ytterbium-doped DCF having a 125-micron-diameter and a 6-micron-diameter core), where it is further amplified, and through fiber Bragg grating 143 and through splitter 144 (e.g., a 99:1 PM tap coupler) that bleeds off a portion (e.g., in some embodiments, about one percent) of the signal to a monitoring detector 145. In some embodiments, a Fabry-Perot or other bandpass filter and/or polarizer are optionally added after the right-hand output of coupler 144 (99 percent of the signal from FBG 143), and the resulting intermediate output is passed to the next component 146 in FIG. 1B. In some embodiments, all of the signal-carrying optical elements (e.g., fibers, couplers, circulators, FBGs, isolators, and the like) are polarization maintaining (PM), i.e., the polarization state of the input signal light will be substantially maintained throughout the lengths of the respective elements.

The seed-signal pulses from source 101 (e.g., in some embodiments, these pulses are polarized) are filtered and amplified by wavelength-selective amplifying filter 103 and further pre-amplified by automatic-gain-controlled amplifier 149. In some embodiments, one key aspect of the present invention is that FBG 141 and FBG 143 are both tuned to a wavelength (an off-wavelength value $\lambda_1$ different than the wavelength $\lambda_0$ of the seed signal) other than the wavelength of the seed-signal pulses from seed source 105 and filter 103, and form a lossy laser cavity, wherein the loss of off-wavelength signal through FBG 141 and FBG 143 normally prevents gain fiber 142 from lasing at the off-wavelength value. However, once sufficient pump power has been accumulated, the gain if the fiber exceeds the loss through FBG 141 and FBG 143, and AGC amplifier 149 will lase just enough to automatically prevent further buildup of energy in gain fiber 142. In some embodiments, the cavity losses through FBGs 141 and 143 are each set to a value (e.g., 10 dB each, in some embodiments) that totals the desired amount of gain for AGC 149 (20 dB in the case where the FBG losses total 20 dB). Whenever the gain begins to exceed 20 dB, the cavity will begin to lase and drain off excess pump energy, limiting the maximum level of inversion of the active species. In some embodiments, the FBGs 141 and 143 surround two or more gain stages and set the total gain of those stages. In other embodiments, other mechanisms are used to bleed off excess pump energy in one or more of the gain stages.

In some embodiments, the 99 percent of the signal light that exits to the right of tap coupler 144 then passes through isolator 146 (in some embodiments, an isolator that operates in a range of about 1060 nm to 1080 nm) into a core of side coupler 155 (in some embodiments, a double-clad side coupler having 125-nm-diameter fibers and 6-micron-diameter cores) that inserts the signal light from isolator 146 into the core of its output fiber and pump light from pump source 150 (in some embodiments, a 6.5-W 915-nm pump source controlled by electronics drivers/circuit 151) into the inner cladding of the output fiber of side coupler 155). The pulsed amplified seed signal then passes into gain fiber 156 (in some embodiments, a ytterbium-doped DCF having a 130-micron-diameter and a 15-micron-diameter core), where it is further amplified and passed through isolator 157 (in some embodiments, a large-mode-area (LMA) pigtailed high-peak-power isolator that operates in a range of about 1060 nm to 1080 nm).

In some embodiments, the signal light that exits (in the figure, toward the right) through isolator 157 then passes into a core of star coupler 165 (in some embodiments, a double-clad side coupler having 250-micron-diameter fibers and 25-micron-diameter cores) that inserts the signal light from isolator 157 into the core of its output fiber and pump light from pump source 160 (in some embodiments, a plurality of 6.5-W 915-nm pump sources 162 controlled by electronics drivers/circuit 161; in other embodiments, fewer pump modules are used, while still other embodiments have many more pump modules 162 and pump at much higher pump power than the 39 watts CW shown here) into the inner cladding of the output fiber of star coupler 165). The pulsed amplified seed signal then passes into high-power gain fiber 170 (in some embodiments, a ytterbium-doped DCF having a 250-micron diameter and a 25-micron-diameter core), where it is further amplified. The output of high-power gain fiber 170 is coupled through a pump dump 171 (in some embodiments, the outer cladding of the fiber is buffed or otherwise stripped away, and the fiber is glued to or pressed against a v-groove in a sapphire substrate, wherein the index of refraction of the glue and/or sapphire allow most of the pump light in the cladding to escape and dissipate, while the signal exits through an endcap at the right-hand end of the fiber. In some embodiments, this output signal then passes through lens 172 which collimates it, through bandpass filter 173 which removes any off-wavelength light from the AGC gain stages and any remaining pump light. through high-power isolator 174 which prevents signal from further right from traveling backward into the amplifier 100, and through output lens 175. In some embodiments, the output pulses are wavelength converted to other wavelengths using suitable non-linear optics.

FIG. 2A is a block diagram of automatic-gain-control (AGC) pulsed fiber-amplifier chain 201 according to some embodiments of the invention. In some embodiments, fiber-amplifier chain 201 includes a pulsed seed source 209 that emits pulses having a seed-signal wavelength $\lambda_0$ (e.g., a wavelength, which is 1060 nm in some embodiments, that is desired for the output of the system, or a wavelength desired for a high-power intermediate signal that will be wavelength converted to one or more different wavelengths by one or more wavelength-conversion devices (such as a wavelength doubler, tripler, quadrupler, and/or quintupler, and/or optical parametric generator (OPG), optical parametric oscillator (OPO), or operational parametric amplifier (OPA) or the like)). The seed pulses from seed source 209 are amplified by a chain of one or more amplifier stages 210 and optionally 220 and/or 230 (and optionally additional amplifier stages, not shown). In some embodiments, pulsed seed source 209 includes a pulsed seed laser diode 205 (e.g., in some embodiments, a 500-mW-peak, 1060-nm Fabry-Perot (F-P) laser diode that is pulsed by electronic circuitry and whose output is optionally bandpass filtered if required and passed through an optical isolator 206 (a unidirectional one-way element that passes light only in the left-to-right direction as shown by the arrow in FIG. 2). The output of isolator 206 passes through a polarization-maintaining side coupler 213 (e.g., in some embodiments, a 6-micron-core 125-micron diameter polarization-maintaining side coupler) that is used to inject pump light from one or more pump sources 212 (in some embodiments, these are 6.5-watt 915-nm wavelength laser diodes, which are controlled by electronic control/drivers/circuit 211 that controls the amount and/or timing of the pump light provided; one source for such pump sources 212 is Sheaumann Laser, Inc., 140 Locke Drive, Marlborough, Mass. 01752 (USA); and 915-nm pump laser information is at www.sheaumann.com/datasheets/SP915-7W.pdf). The pump light (having wavelength $\lambda_P$, which is 915 nm in some embodiments) and seed signal (having wavelength $\lambda_0$, which is 1060 nm in some embodiments) pass through a first fiber-Bragg grating (FBG) 214 (in some embodiments, FBG 214 is a chirped FBG, while in other embodiments, a very short non-chirped FBG is used) into gain fiber 215 (e.g., in some embodiments, this is a Yb-doped fiber having a 6-micron-diameter core and a 125-micron diameter, and is a double-clad fiber that is optically pumped into its cladding such that the pump light enters the core where the seed signal at wavelength $\lambda_0$ is amplified; one source for such fibers is Nufern, 7 Airport Park Road, East Granby, Conn. 06026 (USA); Yb-Fiber information is at nufern.com/fibers.php?ap=A&fcat=3) and through second fiber-Bragg grating (FBG) 216. Together, FBG 214 and FBG 216 form a lossy cavity around gain fiber 215. FBG 214 is substantially transparent to wavelength $\lambda_P$ and wavelength $\lambda_0$, but partially reflective at a third wavelength $\lambda_1$ (e.g., in some embodiments, FBG 214 is approximately 10% reflective at wavelength $\lambda_1$, which is about 1020 nm in some embodiments, (losing about 10 dB from the left end of the cavity)). FBG 216 is also substantially transparent to wavelength $\lambda_0$, but partially reflective at wavelength $\lambda_1$ (e.g., in some embodiments, FBG 216 is approximately 1% reflective at wavelength $\lambda_1$, which is about 1020 nm in some embodiments, (or FBG 214 and FBG 216 reflect a wavelength of about 1040 nm in some other embodiments) (losing about 20 dB from the right end of the cavity)). In some embodiments, the difference in FBG reflectivities of FBG 214 and FBG 216 provides appropriate front/back ratio to inject sufficient CW power at $\lambda_1$ such that the second preamp 220 and power amplifier 230 are gain limited, for self protection and for maintaining overall amplifier gain for first-pulse suppression of excess gain. In some embodiments, together, FBG 214 and FBG 216 form a lossy cavity at wavelength $\lambda_1$ around gain fiber 215 that loses about 30 dB per round trip through the cavity, and thus the cavity requires about 30 dB of gain as the threshold for lasing. As the amount of absorbed pump light accumulates, the gain of fiber 215 increases, and once the round-trip gain reaches or exceeds the round-trip loss, the cavity will lase with a CW signal at wavelength $\lambda_1$ that removes all excess pump light and thus limits the maximum one-pass gain available to be one-half the round-trip gain at this threshold (e.g., a maximum single-pass gain of 15 dB if the maximum round-trip gain is 30 dB). When no seed pulses are provided by seed source 209, the cavity CW lasing at wavelength $\lambda_1$ will drain excess stored energy, leaving enough energy for a single-pass gain of 15 dB for the first pulse. When pulses arrive at a rate fast enough to drain the stored pump energy to a level below that needed to sustain CW lasing, there will be no CW lasing, and all pump energy will be available for amplifying pulses. If a space between pulses is long enough for the pump energy to accumulate enough energy to provide a gain sufficient for CW lasing, then the CW lasing will drain the excess energy. Once pulses again start, the CW lasing will stop and the stored energy in each of the amplification stages 210, 220, and 230 is available for pulse amplification. In some embodiments, the output signal from the first amplifier stage 210 passes through a 99:1 PM tap coupler 217 that, in some embodiments, extracts about 1% of the signal through output coupler 218 (in other embodiments, up to 10% or more is extracted using tap coupler 217, depending on requirements) for use in monitoring and/or providing feedback control. The signal pulses or CW signal from coupler 217 pass through optical isolator 219 (a fiber-based unidirectional one-way element that passes light only in the left-to-right direction as shown by the arrow in FIG. 2). The output of isolator 219 (in some embodiments, a PM isolator that is configured to pass light having a wavelength of between 1060 and 1080 nm in only one direction) passes through a polarization-maintaining side coupler 223 (e.g., in some embodiments, a 6-micron-core 125-micron diameter polarization-maintaining side coupler; one source for such couplers is Avensys Sales Team, 400 Montpellier Blvd., Montreal, QC H4N 2G7 (Canada), and information is at www.avensystech.com/AvensysTech/Home.php?locale=en) that is used to inject pump light from one or more pump sources 222 (which are optionally controlled by electronic control 221 that controls the amount and/or timing of the pump light provided). The pump light (having wavelength $\lambda_P$) and seed signal (having wavelength $\lambda_0$) or CW signal (having wavelength $\lambda_1$) pass into gain fiber 225 (e.g., in some embodiments, this is a Yb-doped fiber having a 15-micron-diameter core and a 130-micron diameter, and is a double-clad fiber that is optically pumped into its cladding such that the pump light enters the core where the seed signal at wavelength $\lambda_0$ or CW signal at wavelength $\lambda_1$ are amplified (the CW signal drains away excess gain that would otherwise accumulate during longer times between pulses)) and the output from gain fiber 225 passes through high-peak-power large-mode-area (LMA) isolator 229 (one source for such high-peak-power LMA isolators is OFR Inc., 62 Depot St., Verona, N.J. 07044, (USA); and isolator information is at www.ofr.com/io_intro.htm) to the next stage 230. The output of isolator 229 passes through a polarization-maintaining side coupler 233 (e.g., in some embodiments, a 6-plus-one 25-micron-core 250-micron diameter polarization-maintaining star coupler) that is used to inject pump light from one or more pump sources 232 (which are optionally controlled by electronic control 231 that controls the amount and/or timing of the pump light provided). The pump light (having wavelength $\lambda_P$) and twice-amplified seed signal (having wavelength $\lambda_0$) or once-amplified CW signal (having wavelength $\lambda_1$) pass into gain fiber 235 (e.g., in some embodiments, this is a Yb-doped fiber having a 250-micron diameter and a 25-micron-diameter core, and is a double-clad fiber that is optically pumped into its cladding such that the pump light enters the core where the seed signal at wavelength $\lambda_0$ or CW signal at wavelength $\lambda_1$ are amplified (the CW signal drains away excess gain that would otherwise accumulate during longer times between pulses)) and the output from gain fiber 235 passes through pump dump 236 (e.g., a wavelength-dependent filter (such as a dichroic filter) or other suitable optical element that removes light of the wavelength $\lambda_P$ pump light)), lens 241, band-pass filter (BPF) 242 (which removes substantially all CW signal (having wavelength $\lambda_1$) but passes substantially all of the amplified pulsed signal (having wavelength $\lambda_0$) through isolator 243 and lens 244 as the output 297.

FIG. 2B is a block diagram of automatic-gain-control pulsed fiber-amplifier chain 202 according to some embodiments of the invention. In some embodiments, AGC fiber-amplifier chain 202 is substantially identical to AGC fiber-amplifier chain 201 if FIG. 2A, except that the second feedback FBG 216 has been replaced by a second feedback FBG 216B that is in the tap stub line that leads to output coupler 218. In some embodiments, the output signal from the first amplifier stage 210 passes through a 99:1 tap coupler 217 that, in some embodiments, extracts about 1% of the signal that is partially reflected at wavelength $\lambda_1$ by second feedback FBG 216B and propagate back through gain fiber 215 to form a cavity with FBG 214 (in other embodiments, up to 10% or more is extracted using tap coupler 217, depending on requirements) for use in monitoring and/or providing feedback control.

Figure 3A:
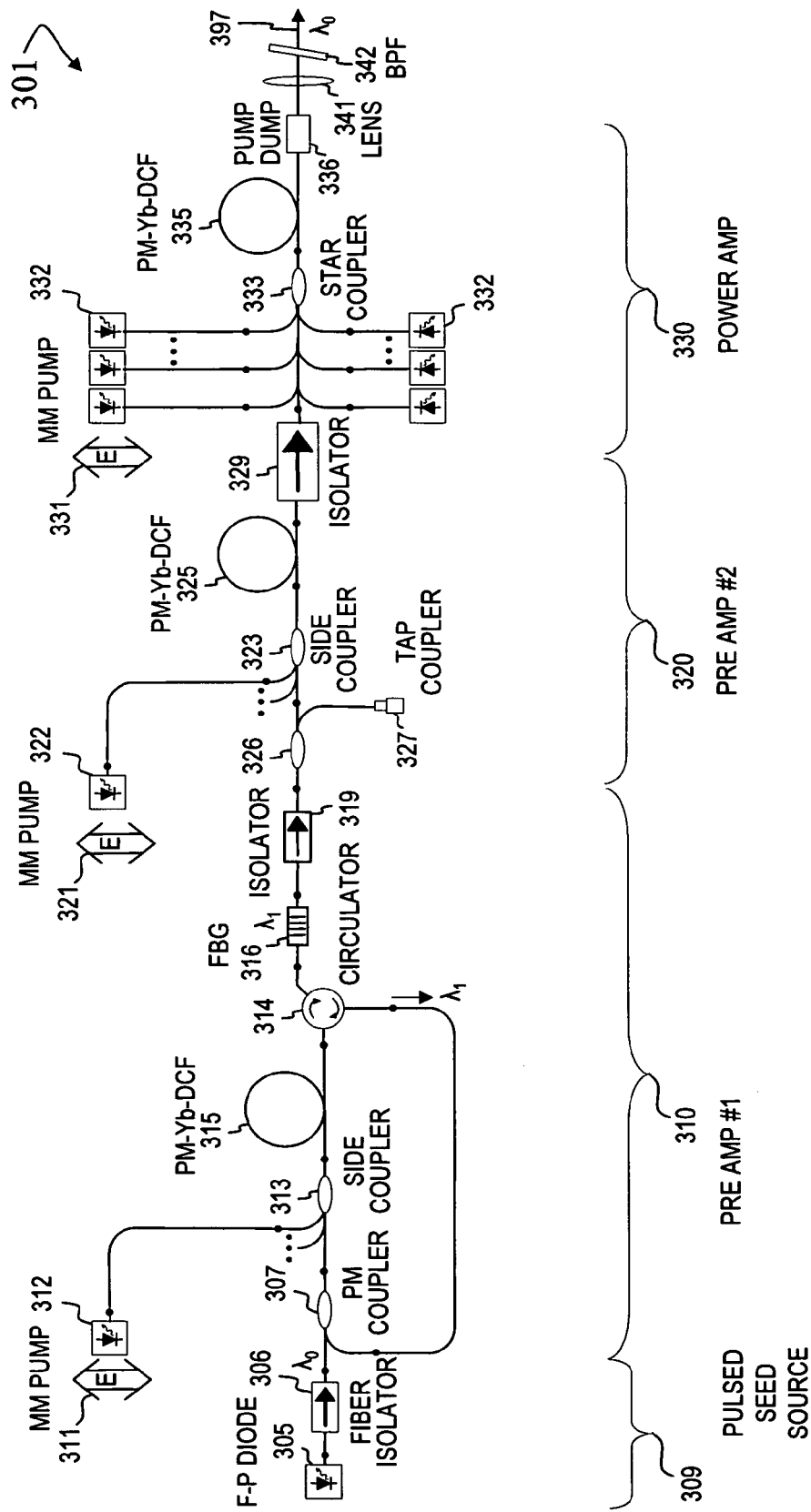
FIG. 3A is a block diagram of automatic-gain-control fiber amplifier chain 301.

FIG. 3A is a block diagram of automatic-gain-control pulsed fiber-amplifier chain 301 according to some embodiments of the invention. In some embodiments, fiber-amplifier chain 301 includes a pulsed seed source 309 that emits pulses having a seed-signal wavelength $\lambda_0$ (e.g., a wavelength desired for the output of the system, or a wavelength desired for a high-power intermediate signal that will be wavelength converted to one or more different wavelengths by one or more wavelength-conversion devices). The seed pulses from seed source 309 are amplified by a chain of one or more amplifier stages 310 and optionally 320 and/or 330 (and optionally additional amplifier stages, not shown). In some embodiments, pulsed seed source 309 includes a pulsed seed laser 305 (e.g., in some embodiments, a Fabry-Perot (F-P) diode laser that is pulsed by electronic circuitry and whose output, which typically has a linewidth of about 1 nm, in some embodiments, is used without additional filtering, but in other embodiments, is optionally bandpass filtered if required, and passed through an optical isolator 306 (a unidirectional one-way element that passes light only in the left-to-right direction as shown by the arrow in FIG. 3A). The output of isolator 306 passes through a polarization-maintaining side coupler 307 that also receives feedback signal at an off-signal wavelength $\lambda_1$ from circulator 314, and both signals feed into a polarization-maintaining (PM) side coupler 313 that is used to inject pump light from one or more pump sources 312 (which are controlled by electronic control 311 that controls the amount and/or timing of the pump light provided). The pump light (having wavelength $\lambda_P$) and seed signal (having wavelength $\lambda_0$) and feedback signal (having wavelength $\lambda_1$) pass into gain fiber 315 (e.g., in some embodiments, this is a Yb-doped fiber having a 125-micron diameter and a 6-micron-diameter core, and is a double-clad fiber that is optically pumped into its cladding such that the pump light enters the core where the seed signal pulses at wavelength $\lambda_0$ is amplified, or, if no pulses have been recently amplified feedback signal (having wavelength $\lambda_1$) starts to lase) and around circulator 314 (sources for fiber isolators 306 and circulators 314 include NovaWave Technologies Inc., 900 Island Dr., Redwood City, Calif. 94065-5150 (USA), information at www.novawavetech.com; and/or Micro-Optics, Inc., Hastings Square Plaza, 470 Schooley's Mountain Road, Hackettstown, N.J. 07840 (USA), information at www.microopticsinc.com) to exit toward FBG 316, which is configured to reflect a small portion (e.g., 1% to 5%, in some embodiments—in some embodiments, the portion not reflected (about 15 dB of signal, in some embodiments) continues into isolator 319, forming a cavity with 15 dB of loss) of feedback signal (having wavelength $\lambda_1$) back to circulator 314 where it exits the bottom port toward PM coupler 307. In some embodiments, for example, the FBG reflectivity of FBG 316 is about 10% (−10 dB) at $\lambda_1$ (which is not equal to $\lambda_0$), the circulator loss of circulator 314 is about −2 dB each of two passes, and PM coupler 307 is a 99:1 coupler (−20 dB), coupler 313 is assumed to approximate a lossless signal-pump combiner, such that the threshold for laser oscillation in preamp 310 occurs when its gain overcomes its round-trip losses of approximately (2+10+2+20=34 dB). In some such embodiments, the gain is thus clamped at 34 dB. The amount of the feedback signal (having wavelength $\lambda_1$) is controlled by the reflectivity of FBG 316 such that when pulses are being generated, there is less than the threshold amount of gain for the feedback signal passed to coupler 307 to cause lasing, but when pulses are not being generated, the gain reaches threshold and the lasing feedback signal drains excess gain/stored pump energy from gain fiber 315 through fiber-Bragg grating (FBG) 316. Together, FBG 316, circulator 314 and couplers 307 and 313 form a lossy cavity around gain fiber 315. FBG 316 is substantially transparent to wavelength $\lambda_0$, but partially reflective at wavelength $\lambda_1$ (e.g., in some embodiments, FBG 316 is approximately 1% reflective at wavelength $\lambda_1$(losing about 20 dB from the right end of the cavity)). In some embodiments, together, FBG 316, circulator 314 and couplers 307 and 313 leave the desired amount of gain available for pulse amplification (e.g., 15 dB in some embodiments) and form a lossy cavity at wavelength $\lambda_1$ around gain fiber 315 that loses about 15 dB per round trip through the cavity, and thus the cavity requires about 15 dB of gain (single trip) as the threshold for lasing. As the amount of absorbed pump light accumulates, the gain of fiber 315 increases, and once the round-trip gain (e.g., 15 dB) reaches or exceeds the round-trip loss (e.g., 15 dB), the cavity will lase with a CW signal at wavelength $\lambda_1$ that removes all excess pump light and thus limits the maximum one-pass gain available to be one-half the round-trip gain at this threshold (e.g., a maximum single-pass gain of 15 dB). When no seed pulses are provided by seed source 309, the cavity CW lasing at wavelength $\lambda_1$ will drain excess stored energy, leaving enough energy for a single-pass gain of 15 dB for the first pulse. When pulses arrive at a rate fast enough to drain the stored pump energy to a level below that needed to sustain CW lasing, there will be no CW lasing, and all pump energy will be available for amplifying pulses. If a space between pulses is long enough for the pump energy to accumulate enough energy to provide a gain sufficient for CW lasing, then the CW lasing will drain the excess energy. Once pulses again start, the CW lasing will stop and the stored energy in each of the amplification stages 310, 320, and 330 is available for pulse amplification. In some embodiments, the output signal from the first amplifier stage 310 passes through optical isolator 319 (a fiber-based unidirectional one-way element that passes light only in the left-to-right direction as shown by the arrow in FIG. 3A) a 99:1 tap coupler 326 that extracts about 1% of the signal through coupler 327 for use in monitoring and/or providing feedback control. The signal pulses or CW signal from coupler 326 passes through a polarization-maintaining side coupler 323 that is used to inject pump light from one or more pump sources 322 (which are optionally controlled by electronic control 321 that controls the amount and/or timing of the pump light provided). The pump light (having wavelength 4) and seed signal (having wavelength $\lambda_0$) or CW signal (having wavelength $\lambda_1$) pass into gain fiber 325 (where the seed signal at wavelength $\lambda_0$ or CW signal at wavelength $\lambda_1$ are amplified (the CW signal drains away excess gain that would otherwise accumulate during longer times between pulses)) and the output from gain fiber 325 passes through isolator 329 to the next stage 330. The output of isolator 329 passes through a polarization-maintaining side coupler 333 that is used to inject pump light from one or more pump sources 332 (e.g., in some embodiments, six multi-mode laser-diode sources each providing 6.5 W at a wavelength of 915 nm), which are optionally controlled by electronic control 331 that controls the amount and/or timing of the pump light provided. The pump light (having wavelength $\lambda_P$) and twice-amplified seed signal (having wavelength $\lambda_0$) or once-amplified CW signal (having wavelength $\lambda_1$) pass into gain fiber 335 (where the seed signal at wavelength $\lambda_0$ or CW signal at wavelength $\lambda_1$ are amplified (the CW signal drains away excess gain that would otherwise accumulate during longer times between pulses)) and the output from gain fiber 335 passes through pump dump 336, lens 341, band-pass filter (BPF) 342 (which removes substantially all CW signal (having wavelength $\lambda_1$) but passes all of the amplified pulsed signal (having wavelength $\lambda_0$) as the output 397.

Figure 3B:
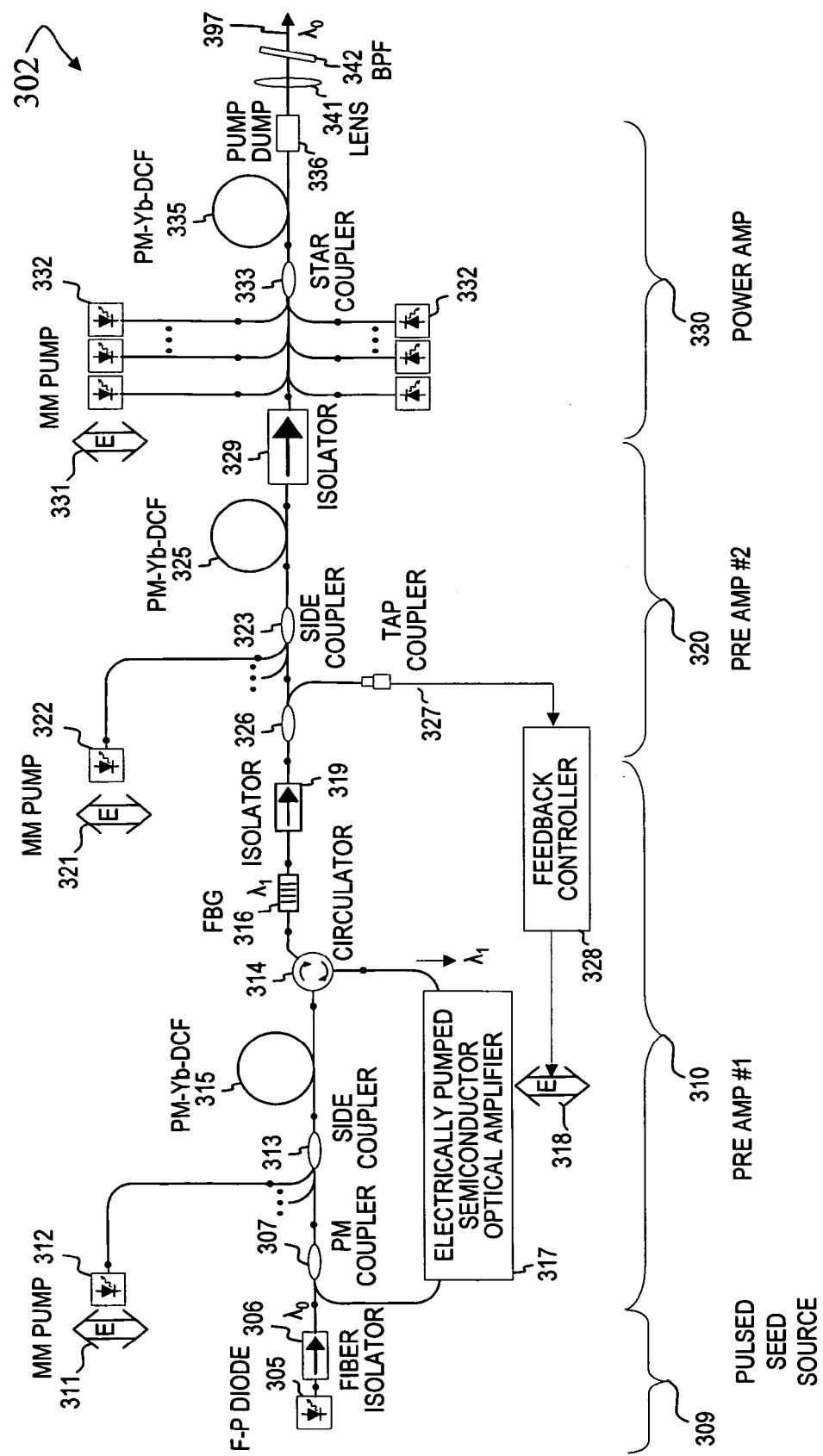
FIG. 3B is a block diagram of automatic-gain-control fiber amplifier chain 302.

FIG. 3B is a block diagram of automatic-gain-control pulsed fiber-amplifier chain 302 according to some embodiments of the invention. In some embodiments, AGC fiber-amplifier chain 302 is substantially identical to AGC fiber-amplifier chain 301 of FIG. 3A, except that an electrically pumped semiconductor optical amplifier 317 is added to the circulator feedback loop for the feedback signal having wavelength $\lambda_1$. In the embodiment shown, the amount of amplification and/or loss incurred by the feedback signal (having wavelength $\lambda_1$) is controlled by an electric signal 318 generated by feedback controller 328 (and/or by the pulse controller that controls the generation of pulses by pulsed seed source 309) such that when pulses are being generated, little or no feedback signal is passed to coupler 307, but when pulses are not being generated, the feedback signal drains excess gain/stored pump energy from gain fiber 315 through fiber-Bragg grating (FBG) 316. Together, FBG 316, circulator 314 and electrically pumped semiconductor optical amplifier 317 form a lossy cavity around gain fiber 315. FBG 316 is substantially transparent to wavelength $\lambda_0$, but partially reflective at wavelength $\lambda_1$ (e.g., in some embodiments, FBG 316 is approximately 1% reflective at wavelength $\lambda_1$(losing about 20 dB from the right end of the cavity)). In some embodiments, together, FBG 316, circulator 314 and electrically pumped semiconductor optical amplifier 317 (which, in some embodiments, is set to provide 5 dB of gain, based on control from feedback controller 328; in other embodiments, some other desired amount of gain or loss is provided by optical element 317 to leave the desired amount of gain available) form a lossy cavity at wavelength $\lambda_1$ around gain fiber 315 that loses about 15 dB per round trip through the cavity, and thus the cavity requires about 15 dB of gain (single trip) as the threshold for lasing.

Figure 4A:
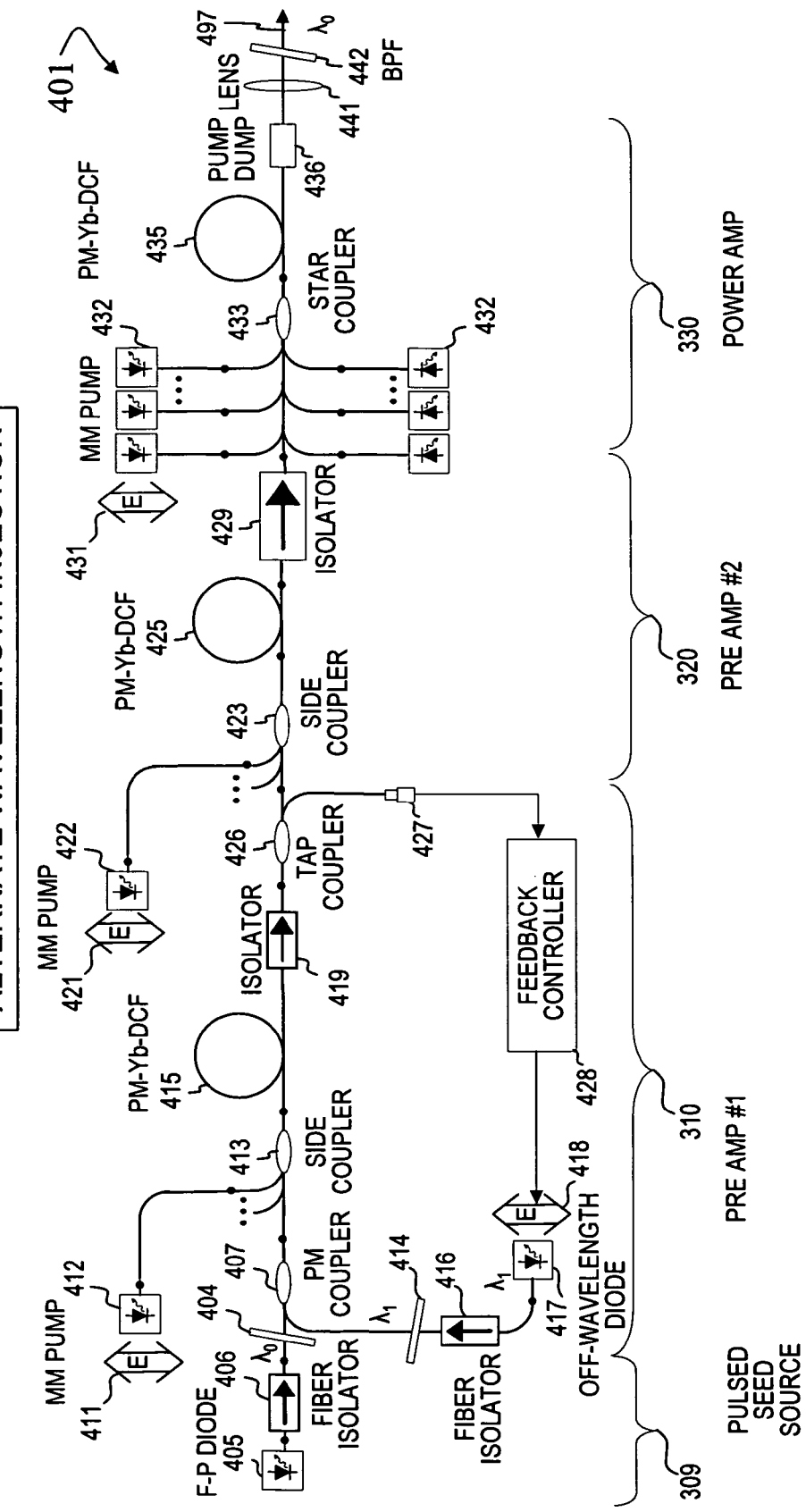
FIG. 4A is a block diagram of automatic-gain-control fiber amplifier chain 401.

FIG. 4A is a block diagram of automatic-gain-control pulsed fiber-amplifier chain 401 according to some embodiments of the invention. In some embodiments, fiber-amplifier chain 401 includes a pulsed seed source 409 that emits pulses having a seed-signal wavelength $\lambda_0$ (e.g., a wavelength desired for the output of the system, or a wavelength desired for a high-power intermediate signal that will be wavelength converted to one or more different wavelengths by one or more wavelength-conversion devices). The seed pulses from seed source 409 are amplified by a chain of one or more amplifier stages 410 and optionally 420 and/or 430 (and optionally additional amplifier stages, not shown). In some embodiments, pulsed seed source 409 includes a pulsed seed laser 405 (e.g., in some embodiments, a 500-mW-peak, 1060-nm Fabry-Perot (F-P) laser diode that is pulsed by electronic circuitry and whose output is passed through an optical isolator 406 (a unidirectional one-way element that passes light only in the left-to-right direction as shown by the arrow in FIG. 4) and bandpass filtered by filter 404. The output of filter 404 passes through a polarization-maintaining side coupler 407 that also receives optical automatic-gain-control signal from diode laser 417 whose output is passed through fiber one-way isolator 416 and filtered to an off-signal-wavelength wavelength by bandpass filter 414, and both signals feed into a polarization-maintaining (PM) side coupler 413 that is used to inject pump light from one or more pump sources 412 (which are controlled by electronic control 411 that controls the amount and/or timing of the pump light provided). The pump light (having wavelength $\lambda_P$) and seed signal (having wavelength $\lambda_0$) and automatic-gain-control signal (having wavelength $\lambda_1$) pass into gain fiber 415 (e.g., in some embodiments, this is a Yb-doped fiber having a 125-micron diameter and a 6-micron-diameter core, and is a double-clad fiber that is optically pumped into its cladding such that the pump light enters the core where the seed signal at wavelength $\lambda_0$ is amplified) and through isolator 419 into 99:1 tap coupler 426 that extracts about 1% of the signal that exits the bottom port 427 and is sensed to generate a feedback signal by feedback controller 428 that controls the amount of off-signal-wavelength automatic-gain-control laser light generated by diode laser 417. The amount of laser light generated by diode laser 417 (having wavelength $\lambda_1$) is controlled by an electric signal generated by feedback controller 428 (and/or by the pulse controller that controls the generation of pulses by pulsed seed source 409) such that when pulses are being generated, little or no off-signal-wavelength automatic-gain-control signal is passed to coupler 407, but when pulses are not being generated, the automatic-gain-control signal drains excess gain/stored pump energy from gain fiber 415 through tap coupler 426 to later gain stages. Together, feedback controller 428 and diode laser 417 work to drain excess gain from gain fiber 415, leaving about 15 dB of gain (single trip) for pulse amplification (e.g., a maximum single-pass gain of 15 dB). When no seed pulses are provided by seed source 409, the CW lasing at wavelength $\lambda_1$ will drain excess stored energy, leaving enough energy for a single-pass gain of 15 dB for the first pulse. If a space between pulses is long enough for the pump energy to accumulate enough energy to provide a gain sufficient for CW lasing, then the CW lasing will drain the excess energy. Once pulses again start, the CW lasing will stop and the stored energy in each of the amplification stages 410, 420, and 430 is available for pulse amplification. In some embodiments, the output signal from the first amplifier stage 410 passes through optical isolator 419 (a fiber-based unidirectional one-way element that passes light only in the left-to-right direction as shown by the arrow in FIG. 4) a 99:1 tap coupler 426 that extracts about 1% of the signal through coupler 427 for use in monitoring and/or providing feedback control. The main left-to-right signal pulses or CW signal from coupler 426 passes through a polarization-maintaining side coupler 423 that is used to inject pump light from one or more pump sources 422 (which are optionally controlled by electronic control 421 that controls the amount and/or timing of the pump light provided). The pump light (having wavelength 4) and seed signal (having wavelength $\lambda_0$) or CW signal (having wavelength $\lambda_1$) pass into gain fiber 425 (where the seed signal at wavelength $\lambda_0$ or CW signal at wavelength $\lambda_1$ are amplified (the CW signal drains away excess gain that would otherwise accumulate during longer times between pulses)) and the output from gain fiber 425 passes through isolator 429 to the next stage 430. The output of isolator 429 passes through a polarization-maintaining side coupler 433 that is used to inject pump light from one or more pump sources 432 (e.g., in some embodiments, six multi-mode laser-diode sources each providing 6.5 W at a wavelength of 915 nm), which are optionally controlled by electronic control 431 that controls the amount and/or timing of the pump light provided. The pump light (having wavelength $\lambda_P$) and twice-amplified seed signal (having wavelength $\lambda_0$) or once-amplified CW signal (having wavelength $\lambda_1$) pass into gain fiber 435 (where the seed signal at wavelength $\lambda_0$ or CW signal at wavelength $\lambda_1$ are amplified (the CW signal drains away excess gain that would otherwise accumulate during longer times between pulses)) and the output from gain fiber 435 passes through pump dump 436, lens 441, band-pass filter (BPF) 442 (which removes substantially all CW signal (having wavelength $\lambda_1$) but passes all of the amplified pulsed signal (having wavelength $\lambda_0$) as the output 497.

Figure 4B:
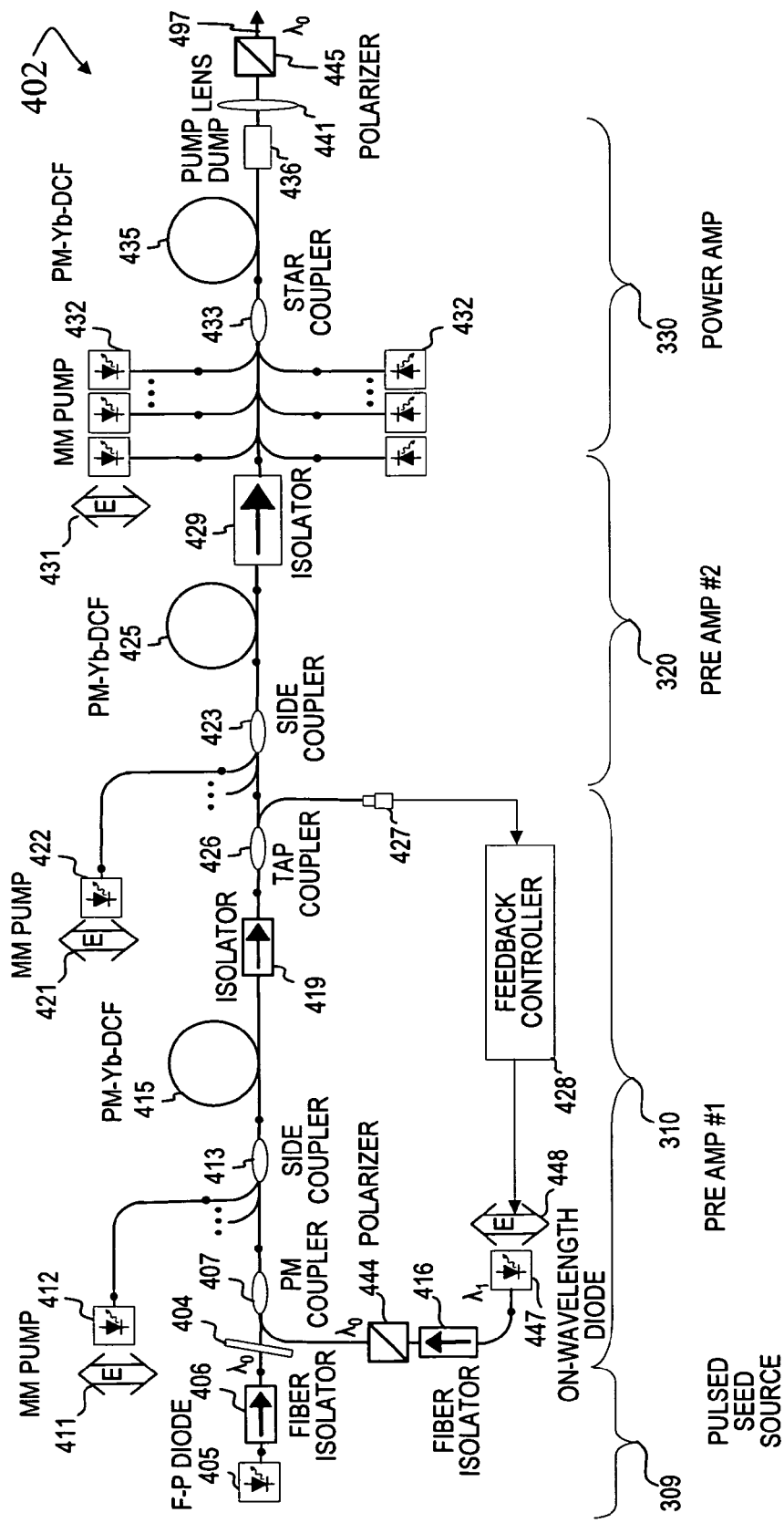
FIG. 4B is a block diagram of automatic-gain-control fiber amplifier chain 402.

FIG. 4B is a block diagram of automatic-gain-control pulsed fiber-amplifier chain 402 according to some embodiments of the invention. In some embodiments, AGC fiber-amplifier chain 402 is substantially identical to AGC fiber-amplifier chain 401 if FIG. 4A, except that, rather than using an off-signal-wavelength CW AGC signal from off-wavelength laser diode 417 as in FIG. 4A, system 402 instead uses a CW AGC signal from on-wavelength laser diode 447 that is polarized (or is converted to a linearly polarized signal by polarizer 444 (e.g., a polarizing beam cube or other suitable polarizer) to a polarization perpendicular to the polarization of the seed signal pulses from seed source 409. Further, at the right-hand end (as the components are arranged in the Figure) of the amplifier chain, the bandpass filter 442 in FIG. 4A is replaced by a polarizer 446 in FIG. 4B (e.g., a polarizing beam cube or other suitable polarizer) that removes any amplified CW signal from CW source laser diode 447 (e.g., by reflecting any light that is polarized at a 90-degree angle to the polarization of the desired polarized pulses). In some embodiments, the CW signal has the same wavelength $\lambda_0$ as the signal pulses, but is of a different angle of polarization and can thus be removed at the end of the amplifier chain. (In other embodiments, the CW signal can be of a different polarization and of a different wavelength, and in some such embodiments, multiple optical elements 442 and/or 446 can be used to remove the amplified CW signal. In still other embodiments, an acousto-optic modulator, electro-optic modulator, or other electrically controllable modulator can be triggered to remove the amplified CW signal at the output of the AGC amplifier chain while passing the signal pulses to the output.) Thus, even though the CW signal is of the same wavelength $\lambda_0$ as the signal pulses, suitable optical elements can be used to remove the amplified CW signal at the output.

Figure 5:
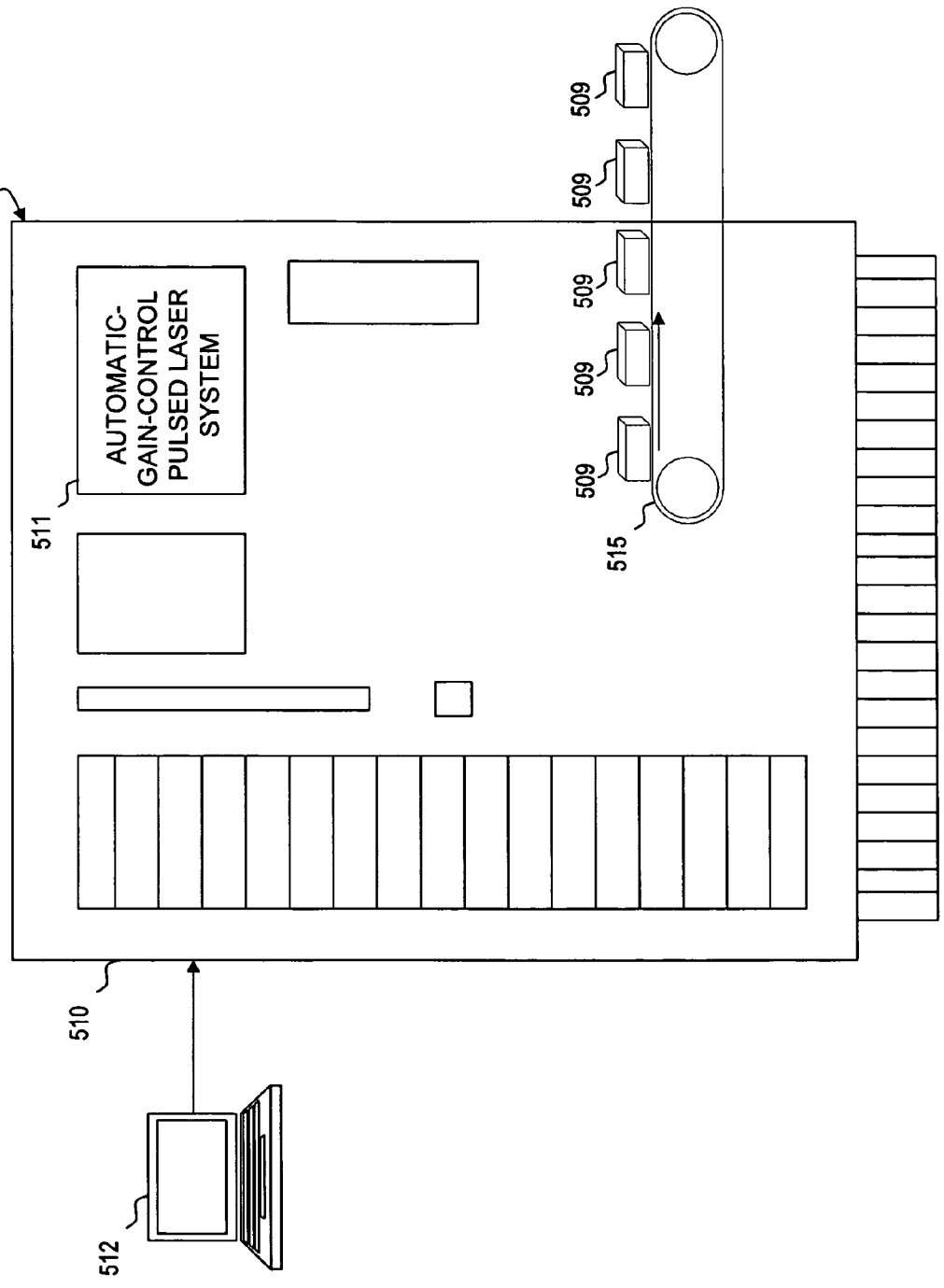
FIG. 5 is a block diagram of fiber amplifier system 500.

FIG. 5 is a block diagram of a materials-processing system 500 using one or more of the automatic-gain-control pulsed laser systems 511 (such as system 100 of FIG. 1A and FIG. 1B, system 201 of FIG. 2A, system 202 of FIG. 2B, system 301 of FIG. 3A, system 302 of FIG. 3B, system 401 of FIG. 4A or system 402 of FIG. 4B) as described herein. In some embodiments, materials-processing system 500 includes a production unit 510 that is controlled by one or more controllers 512 and which uses the laser output of one or more automatic-gain-control pulsed laser systems 511. In some embodiments, each automatic-gain-control pulsed laser system 511 includes one or more of the designs exemplified by the systems described above and shown in FIGS. 1A-1B, 2, 3, and 4. In various embodiments, the pulsed light output 197, 297, 397, 497 from the IR lasers shown is used directly, while in other embodiments, the light output 197, 297, 397, 497 from the IR laser is an intermediate beam that is further wavelength converted by any of the wavelength-conversion device 690 described for FIG. 6B (such as a wavelength doubler or tripler, optical parametric generator (OPG), optical parametric oscillator (OPO), or operational parametric amplifier (OPA) or the like). In some embodiments, a production line (such as conveyor line 515) is used to fabricate a plurality of products 509 (or a batch of material or composition-of-matter product), wherein the product(s) are processed by the light pulses generated by the one or more of the automatic-gain-control pulsed laser systems 511.

In some embodiments, the present invention provides high-power output pulses that can be used to remove paint, machine via holes (small holes in electronic substrates or printed circuit boards (PCBs)), metal and/or semiconductor annealing, laser welding, semiconductor-memory repair (e.g., opening metal lines to connect and/or disconnect spare sections of memory for other sections that has errors, thus increasing the yield of usable chips in memory manufacture), laser trimming of precision resistors (e.g., for analog-to-digital converters and digital-to-analog converters), other materials processing and/or the like.

Some embodiments include a materials processing system having one or more of the laser systems described herein that is used to provide the laser energy for the materials processing operation.

Figure 6C:
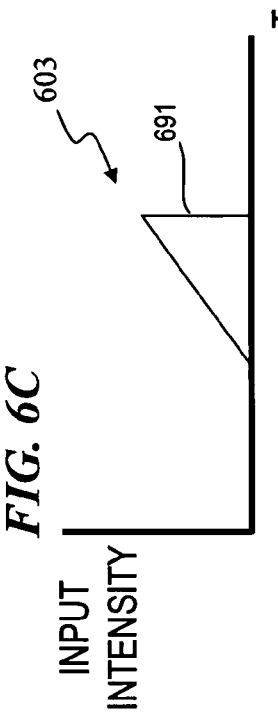
FIG. 6C is a schematic graph 603 of a ramped seed pulse 691.
Figure 6D:
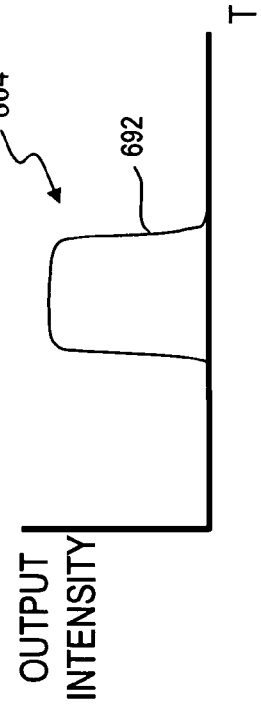
FIG. 6D is a schematic graph 604 of a squared output pulse 692.
Figure 6A:
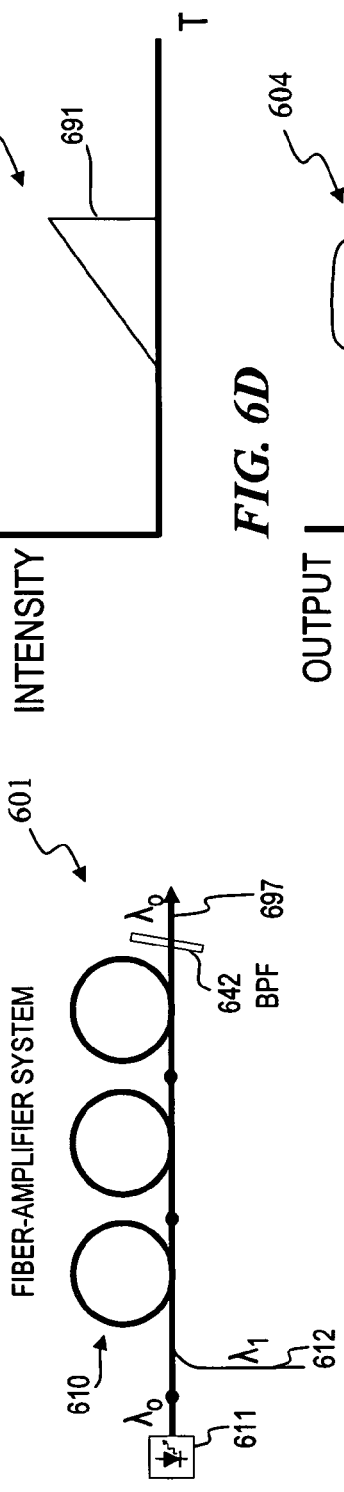
FIG. 6A is a block diagram of fiber amplifier system 601 using the intermediate IR signal 697 directly.

FIG. 6A is a block diagram of fiber-amplifier system 601 using the intermediate IR signal 697 directly. In some embodiments, fiber-amplifier system 601 receives seed pulses at wavelength $\lambda_0$ from source 611, and CW automatic-gain-control (AGC) signal 612 at wavelength $\lambda_1$, one or the other of which uses the energy in amplifier chain 610. The output signal 697 is wavelength filtered by bandpass filter 642 to block any amplified CW automatic-gain-control (AGC) signal 612 at wavelength $\lambda_1$, but to pass amplified pulses at wavelength $\lambda_0$.

Figure 6B:
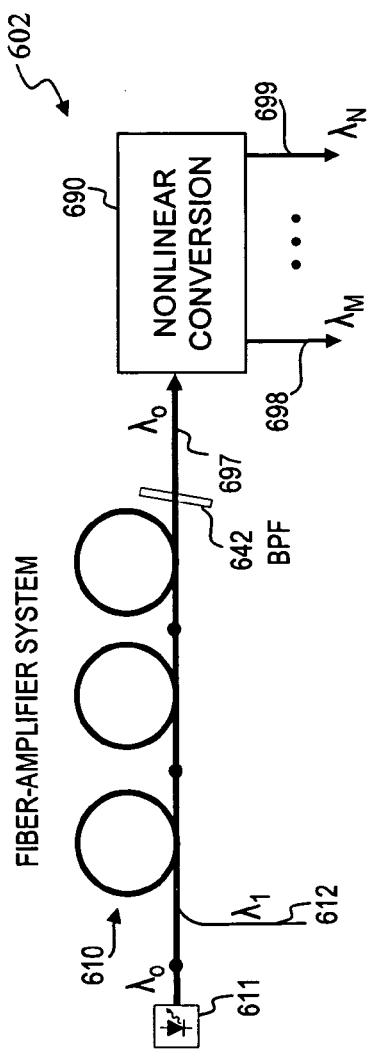
FIG. 6B is a block diagram of fiber amplifier system 602 using one or more different wavelength signals 698-699 that are derived from the intermediate IR signal 697.

FIG. 6B is a block diagram of fiber-amplifier system 602 that outputs one or more different wavelength signals 698-699 that are derived from the intermediate IR signal 697. In some embodiments, fiber-amplifier system 601 receives seed pulses at wavelength $\lambda_0$ from source 611, and CW automatic-gain-control (AGC) signal 612 at wavelength $\lambda_1$, one or the other of which uses the energy in amplifier chain 610. The intermediate output signal 697 is wavelength filtered by bandpass filter 642 to block any amplified CW automatic-gain-control (AGC) signal 612 at wavelength $\lambda_1$, but to pass amplified pulses at wavelength $\lambda_0$ to wavelength-conversion device 690, where the high-power pulses are wavelength converted to the desired output signal 698 at wavelength $\lambda_M$ and/or other output signals up to signal 699 at wavelength $\lambda_N$.

FIG. 6C is a schematic graph 603 of a ramped seed pulse 691. In some embodiments, the seed pulse is ramped in order to compensate for the gain-factor decrease in the amplifying stages (those stages have an initially high gain that decreases during the pulse as the stored energy is used, so the increasing ramp of the seed compensates to provide a more-constant output amplitude).

FIG. 6D is a schematic graph 604 of a squared output pulse 692 that is the result of using a ramped gain-compensating seed-pulse shape as shown in FIG. 6C.

Figure 6E:
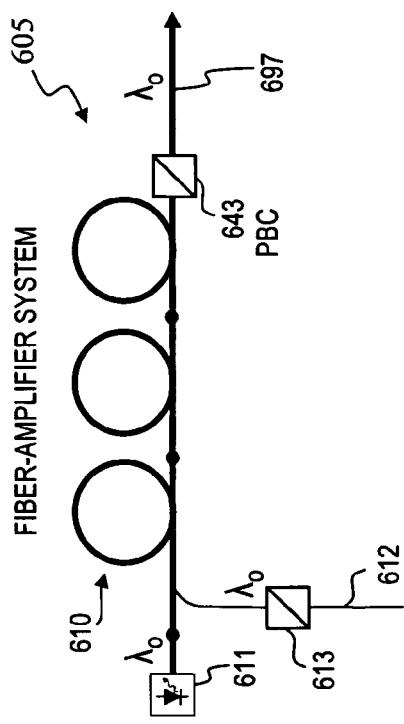
FIG. 6E is a block diagram of fiber amplifier system 605 using the intermediate IR signal 697 directly.

FIG. 6E is a block diagram of fiber-amplifier system 605 using the intermediate IR signal 697 directly. In some embodiments, fiber-amplifier system 605 receives polarized seed pulses at wavelength $\lambda_0$ from source 611, and a cross-polarized CW automatic-gain-control (AGC) signal 612 (in some embodiments, at wavelength $\lambda_0$, while in other embodiments, at a different wavelength $\lambda_1$) one or the other of which uses the energy in amplifier chain 610. The output signal 697 is polarized to remove the amplified CW cross-polarized CW automatic-gain-control (AGC) signal by polarizer 643 (e.g., a polarizing beam cube) to block any amplified cross-polarized CW automatic-gain-control (AGC) signal 612, but to pass amplified polarized pulses at wavelength $\lambda_0$.

Figure 6F:
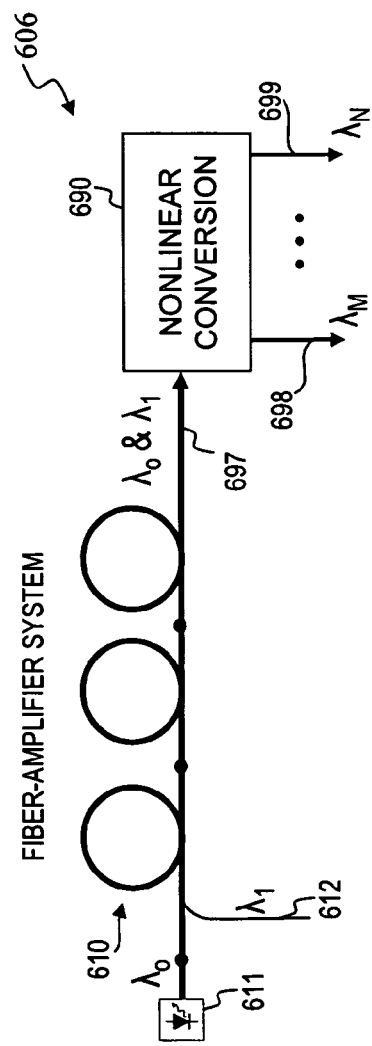
FIG. 6F is a block diagram of fiber amplifier system 606 using one or more different wavelength signals 698-699 that are derived from the intermediate IR signal 697.

FIG. 6F is a block diagram of fiber-amplifier system 606 that outputs one or more different wavelength signals 698-699 that are derived from the intermediate IR signal 697. In some embodiments, fiber-amplifier system 601 receives seed pulses at wavelength $\lambda_0$ from source 611, and CW automatic-gain-control (AGC) signal 612 at wavelength $\lambda_1$, one or the other of which uses the energy in amplifier chain 610. In some embodiments, wavelength-conversion device 690 is not sensitive to wavelength $\lambda_1$ but rather only acts on light of wavelength $\lambda_0$. The intermediate output signal 697 is, in the embodiment shown, not wavelength filtered, but rather passes any amplified CW automatic-gain-control (AGC) signal 612 at wavelength $\lambda_1$, and amplified pulses at wavelength $\lambda_0$ to wavelength-conversion device 690, where the amplified CW signal at wavelength $\lambda_1$ is ignored but high-power pulses are wavelength converted to the desired output signal 698 at wavelength $\lambda_M$ and/or other output signals up to signal 699 at wavelength $\lambda_N$.

In some embodiments, the present invention provides high-power output pulses that can be used to cut, ablate, and/or cauterize soft tissue (such as may be needed for surgery on a human patient such as described in U.S. patent application Ser. No. 11/536,642 titled "APPARATUS AND METHOD FOR STIMULATION OF NERVES AND AUTOMATED CONTROL OF SURGICAL INSTRUMENTS," which in turn uses inventions described in U.S. patent application Ser. No. 11/257,793 titled "APPARATUS AND METHOD FOR OPTICAL STIMULATION OF NERVES AND OTHER ANIMAL TISSUE," U.S. patent application Ser. No. 11/536,639 titled "MINIATURE APPARATUS AND METHOD FOR OPTICAL STIMULATION OF NERVES AND OTHER ANIMAL TISSUE," and U.S. Provisional Patent Application Ser. No. 60/872,930 titled "APPARATUS AND METHOD FOR CHARACTERIZING OPTICAL SOURCES USED WITH HUMAN AND ANIMAL TISSUES." In other embodiments, the present invention provides high-power output pulses that can be used to create micropores with minimal thermal damage to soft tissue (such as may be needed for surgery on a human patient such as described in U.S. patent application Ser. No. 12/077,083 titled "FRACTIONAL PHOTOLYSIS USING SUB-MICROSECOND PULSED FIBER LASER(S)" filed Mar. 13, 2008. In some embodiments, the present invention provides high-power output pulses that can be used to cut, ablate, and/or cauterize soft tissue (such as may be needed for surgery on a human patient such as described in U.S. patent application Ser. No. 12/050,937 titled "A METHOD AND MULTIPLE-MODE DEVICE FOR HIGH-POWER SHORT-PULSE-LASER ABLATION AND CW CAUTERIZATION OF BODILY TISSUES" filed Mar. 18, 2008, each of which are incorporated herein by reference. In some embodiments of the present invention, the pulsed seed source (e.g., 209 of FIG. 2A) includes a non-pulsed signal mode such as described in U.S. patent application Ser. No. 12/050,937, which provides an alternative CW or quasi-CW mode for the signal as an alternative to the pulsed signal mode described above, such that the laser source has a plurality of modes, one of which is an AGC pulsed mode.

Figure 7A:
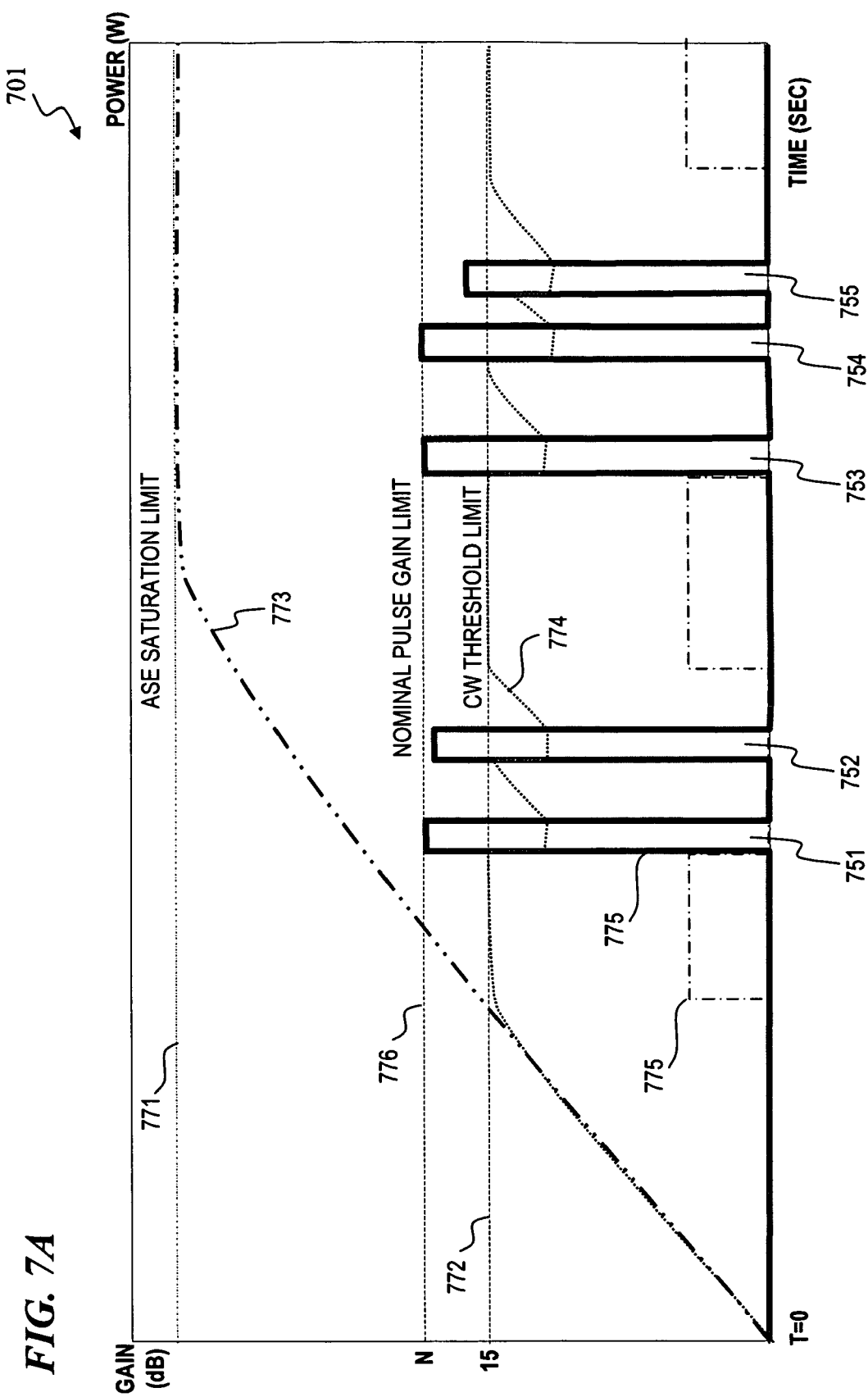
FIG. 7A is a graph 701 showing both gain versus time and power versus time.

FIG. 7A is a graph 701 showing both cavity gain versus time and power versus time (for the signal pulses 775). In some embodiments, graph 701 conceptually represents the situation for FIG. 2A, FIG. 2B, FIG. 3A, FIG. 3B, FIG. 4A, FIG. 6A, and FIG. 6B, wherein the gain for the off-wavelength CW signal at wavelength $\lambda_1$ may not equal the gain for the signal pulses at wavelength $\lambda_0$. In some embodiments, at time T=0, the pump lasers are turned on and pump energy 773 starts to accumulate in the gain fibers (e.g., in some embodiments, Yb-doped fibers having an energy lifetime of about 1 millisecond). If there were no gain control, the accumulated pump energy 773 would continue to increase until amplified spontaneous emission (ASE) and/or self pulsing (which can destroy the fiber, damage endcaps, propagate backward into prior stages that are unable to handle such high-power pulses, and/or cause other deleterious problems) starts. Therefore, in some embodiments, the present invention provides an automatic-gain-control mechanism that uses a CW signal to remove any energy above the CW threshold limit 772 (e.g., by starting CW lasing signal 775) once the gain reaches some desired limit 772 (e.g., 15 dB in the first pre-amp stage, in some embodiments; in other embodiments, other thresholds for AGC are used). As soon as a first seed pulse 751 of pulse signal 775 is launched, it is amplified to a normal pulse gain limit 776 (e.g., at N dB, wherein the normal pulse gain limit 776 can be greater than, equal to, or less than the CW threshold limit 772 (in some embodiments, using short gain fibers with high inversion levels, the gain at $\lambda_1$=1030 nm is larger than the gain at $\lambda_0$=1060 nm, while in other embodiments, using long gain fibers with low inversion levels, the gain at $\lambda_1$=1030 nm is less than the gain at $\lambda_0$=1060 nm); in the embodiment shown, pulse gain limit 776 is greater than CW threshold limit 772). If a second pulse 752 is launched slightly before the gain curve 774 reaches the CW threshold limit 772, that second pulse 752 will experience slightly less gain as compared to the gain N experienced by first pulse 751, although the gains will be nearly equal. The large time until the third pulse allows gain to again reach CW threshold limit 772 and the CW lasing signal 775 again starts between the second pulse 752 and the third pulse 753, and the third pulse 753 experiences the gain N experienced by first pulse 751. The fourth pulse 754 arrives just in time to prevent lasing of the CW signal, yet it experiences the full gain N experienced by first pulse 751. However, the fifth pulse 755 arrives much before the gain reaches the threshold for lasing of the CW signal, so it experiences much less gain than the full gain N experienced by first pulse 751. Thus, as long as there is enough time between pulses to have the pulse gain reach its nominal value N, every pulse will experience the full gain N experienced by first pulse 751. However, the AGC system prevents any gain higher than the full gain N experienced by first pulse 751. Note that the full gain N experienced by first pulse 751 can be different than the CW threshold limit 772, because of the different gains that are available for different wavelengths (these gain differences depend on the inversion levels, doping concentrations, fiber lengths, and/or possibly other factors).

Figure 7B:
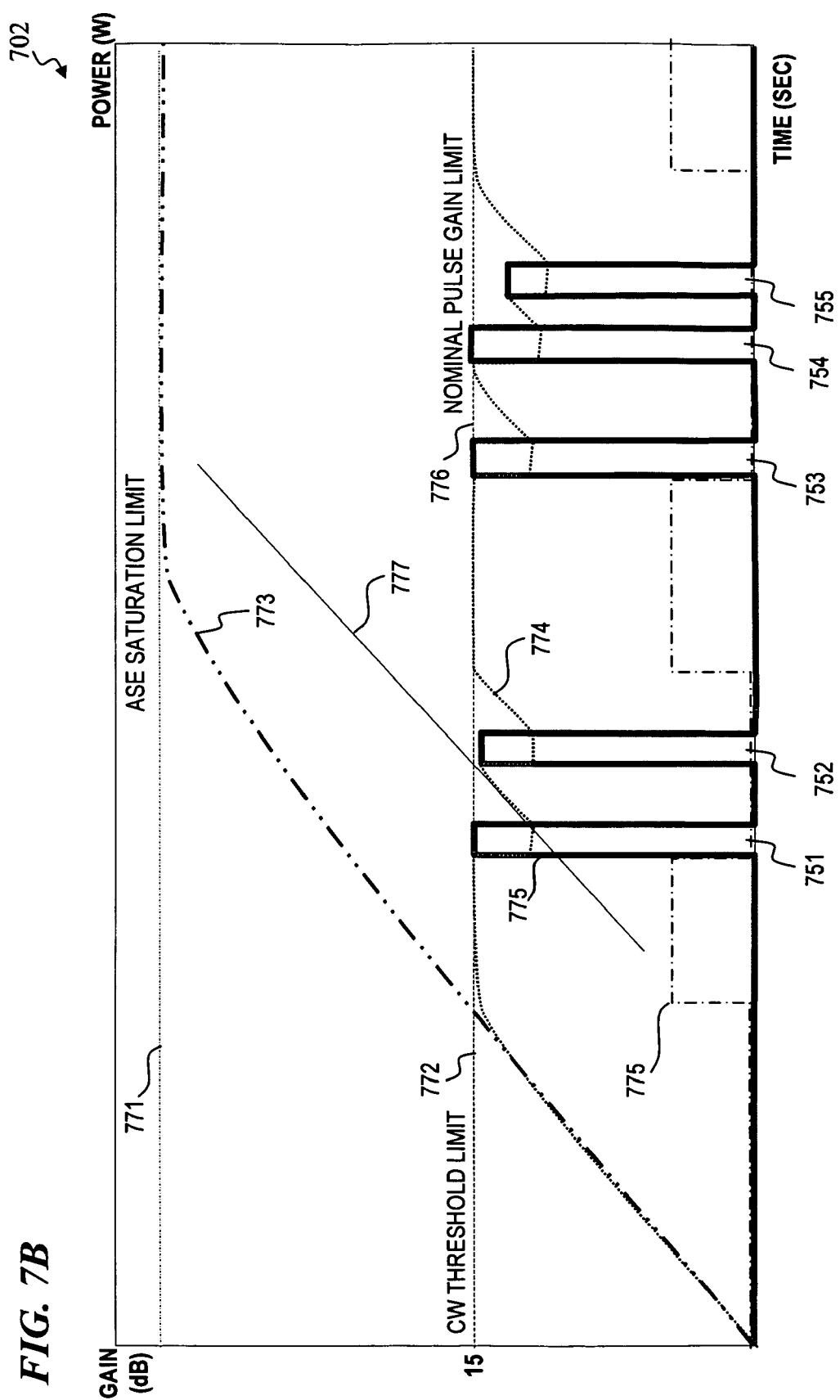
FIG. 7B is a graph 702 showing both gain versus time and power versus time.

FIG. 7B is a graph 702 showing both gain versus time and power versus time (for the signal pulses 775). The main difference between FIG. 7B and FIG. 7A is that the nominal pulse gain limit 776 in FIG. 7B is equal to the CW threshold for lasing 772, whereas the nominal pulse gain limit 776 in FIG. 7A is larger than the CW threshold for lasing 772. In some embodiments, graph 702 conceptually represents the situation for FIG. 4B, wherein the gain for the signal-wavelength CW signal at wavelength $\lambda_0$ will, in some embodiments, equal the gain for the signal pulses at wavelength $\lambda_0$. In some embodiments, at time T=0, the pump lasers are turned on and pump energy 773 starts to accumulate in the gain fibers. If there were no gain control, the accumulated pump energy 773 would continue to increase until amplified spontaneous emission (ASE) and/or self pulsing (which can destroy the fiber, damage endcaps, propagate backward into prior stages that are unable to handle such high-power pulses, and/or cause other deleterious problems) starts. Therefore, in some embodiments, the present invention provides an automatic-gain-control mechanism that uses a CW signal to remove any energy above the CW threshold limit 772 (e.g., by starting CW signal 775 (from CW diode laser 447 in FIG. 4B at wavelength $\lambda_0$) once the gain reaches some desired limit 772 (e.g., 15 dB in the first pre-amp stage, in some embodiments; in other embodiments, other thresholds for AGC are used). In some embodiments, the CW signal 775 can be started by the electrical control circuit that controls the launching if seed pulses, wherein if no seed pulses are to be launched, the CW AGC signal 775 is sent to drain the excess pump energy from the fibers in all the gain stages 410, 420, and 430 in FIG. 4B) As soon as a first seed pulse 751 of pulse signal 775 is launched, it is amplified to a normal pulse gain limit 776 (e.g., at 15 dB, wherein the normal pulse gain limit 776 is equal to the CW threshold limit 772 in the embodiment shown). If a second pulse 752 is launched slightly before the gain curve 774 reaches the CW threshold limit 772, that second pulse 752 will experience slightly less gain as compared to the gain N (e.g., 15 dB in the first preamp 410, in some embodiments) experienced by first pulse 751, although the gains will be nearly equal. The large time until the third pulse allows gain to again reach CW threshold limit 772 and the CW lasing signal 775 again starts between the second pulse 752 and the third pulse 753, and the third pulse 753 experiences the gain N (e.g., 15 dB in the first preamp 410, in some embodiments) experienced by first pulse 751. The fourth pulse 754 arrives just in time to prevent lasing of the CW signal, yet it experiences the full gain N experienced by first pulse 751. However, the fifth pulse 755 arrives much before the gain reaches the threshold for lasing of the CW signal, so it experiences much less gain than the full gain N (e.g., 15 dB in the first preamp 410, in some embodiments) experienced by first pulse 751. Thus, as long as there is enough time between pulses to have the pulse gain reach its nominal value N (e.g., 15 dB in the first preamp 410, in some embodiments), every pulse will experience the full gain N experienced by first pulse 751. However, the AGC system prevents any gain higher than the full gain N experienced by first pulse 751.

In some embodiments, the systems of the present invention are designed such that the amplification experienced by all pulses is in the range of about 13 dB to about 15 dB in the first pre-amplifier stages. In some embodiments, enough pump power is supplied such that all pulses experience substantially the same gain (e.g., 15 dB in the first pre-amplifier stage), for example, by supplying enough pump power relative to the pulse repetition rate (PRR) such that the AGC lasing threshold is reached at or before each successive pulse and/or such that the CW AGC signal will drain excess pump energy from the later stages in the amplifier chain.

In some embodiments, the present invention provides a method that includes providing a gain fiber; optically pumping the gain fiber using pump light; amplifying seed-signal pulses having a signal wavelength using the gain fiber to obtain amplified output pulses; and automatically limiting a gain of the gain fiber.

In some embodiments, the automatically limiting of the gain includes forming a lossy resonant cavity that includes the gain fiber wherein a resonant wavelength of the cavity is different than the signal wavelength; and lasing the resonant cavity at the resonant wavelength only when a gain of the gain fiber exceeds a predetermined value.

In some embodiments, the resonant cavity uses one or more fiber Bragg gratings (FBGs) tuned to the resonant wavelength.

Some embodiments further include passing the seed signal pulses through the one or more FBGs.

Some embodiments further include wavelength converting the amplified output pulses using nonlinear optical crystals wherein the automatically limiting of the gain includes coupling a CW signal to the gain fiber such that a level of inversion of the gain fiber is limited, thereby limiting the gain available to amplify pulses, but wherein the CW signal between the signal pulses, when output, is of such a low power that it does not result in significant wavelength conversion to the desired output wavelength in the nonlinear optical crystals, due to the limited power in the CW signal.

In some embodiments, the automatically limiting of the gain includes coupling a background signal to the gain fiber, the background signal having a polarization different than the seed signal pulses and amplifying the background signal using the gain fiber to obtain amplified signal of the different polarization; and rejecting the amplified signal of the different polarization using a polarizer.

In some embodiments, a bandwidth of the seed signal is limited to a small fraction of a gain bandwidth of the gain fiber, and wherein the automatically limiting of the gain includes coupling a background signal having an "off-signal" wavelength (i.e., one inside the gain bandwidth but outside the seed signal's bandwidth) to the gain fiber, which then limits the level of inversion in the gain fiber.

In some embodiments, a bandwidth of the seed signal is limited to a small fraction of a gain bandwidth of the gain fiber, and wherein the automatically limiting of the gain includes coupling a background signal having an "off-signal" wavelength (i.e., one inside the gain bandwidth but outside the seed signal's bandwidth, wherein the gain fiber is ytterbium doped and has more than about 30 nanometers of gain bandwidth, but the seed signal operates at 10 nm or less of linewidth for the seed signal amplification) to the gain fiber, which then limits the level of inversion in the gain fiber; and rejecting the amplified "off-signal" wavelength using a wavelength-sensitive bandpass filter.

In some embodiments, the automatically limiting of the gain includes using partial reflectors to allow self-lasing of the gain fiber if a pulsed signal is not present in order to saturate a gain of the gain fiber below a self-lasing threshold.

In some embodiments, the automatically limiting of the gain includes using partially reflecting fiber Bragg gratings (FBGs) configured at an "off-signal" wavelength and placed at both ends of one or more amplification stages that include the gain fiber to form a cavity that allows self-lasing of the gain fiber if the pulsed seed signal is not present, such that those stages will begin to lase at the "off-signal" wavelength once a gain within those stages exceeds to losses of the "off-signal" wavelength leaking out the FBGs, but wherein the FBGs are substantially transparent to the signal wavelength of the signal pulses in order to saturate a gain of the gain fiber at a self-lasing threshold, where relaxation oscillations of such a configuration produce transients in the population inversion and gain, and multiple wavelengths with different self-lasing thresholds are used to damp out the relaxation oscillations.

Some embodiments further include wavelength converting the amplified output pulses using nonlinear optical crystals.

In some embodiments, the present invention provides an apparatus that includes a gain fiber; a source of pump light coupled to the gain fiber; a source of seed-signal pulses having a signal wavelength coupled to the gain fiber, wherein the gain fiber outputs amplified signal pulses; and an automatic-gain-control mechanism configured to limit gain of the gain fiber.

In some embodiments, the automatic-gain-control mechanism includes a lossy resonant cavity that includes the gain fiber wherein a resonant wavelength of the cavity is different than the signal wavelength; wherein the resonant cavity lases at the resonant wavelength only when a gain of the gain fiber exceeds a predetermined value.

In some embodiments, the resonant cavity uses one or more fiber Bragg gratings (FBGs) tuned to the resonant wavelength.

In some embodiments, the seed signal pulses pass through the one or more FBGs.

Some embodiments further include a wavelength-converting device that includes one or more nonlinear optical crystals and is coupled to receive the amplified output pulses, wherein the automatic-gain-control mechanism includes a connection that couples a CW signal to the gain fiber such that a level of inversion of the gain fiber is limited, thereby limiting the gain available to amplify pulses, but wherein the CW signal between the signal pulses, when output, is of such a low power that it does not result in significant wavelength conversion to the desired output wavelength in the nonlinear optical crystals, due to the limited power in the CW signal.

In some embodiments, the automatic-gain-control mechanism includes means for coupling a background signal to the gain fiber, the background signal having a polarization different than the seed signal pulses and amplifying the background signal using the gain fiber to obtain amplified signal of the different polarization; and means for rejecting the amplified signal of the different polarization using a polarizer.

In some embodiments, a bandwidth of the seed signal is limited to a small fraction of a gain bandwidth of the gain fiber, and wherein the automatic-gain-control mechanism includes means for coupling a background signal having an "off-signal" wavelength (i.e., one inside the gain bandwidth but outside the seed signal's bandwidth) to the gain fiber, which then limits the level of inversion in the gain fiber.

In some embodiments, a bandwidth of the seed signal is limited to a small fraction of a gain bandwidth of the gain fiber, and wherein the automatic-gain-control mechanism includes means for coupling a background signal having an "off-signal" wavelength (i.e., one inside the gain bandwidth but outside the seed signal's bandwidth, wherein the gain fiber is ytterbium doped and has more than about 30 nanometers of gain bandwidth, but the seed signal operates at 10 nm or less of linewidth for the seed signal amplification) to the gain fiber, which then limits the level of inversion in the gain fiber; and means for rejecting the amplified "off-signal" wavelength using a wavelength-sensitive bandpass filter.

In some embodiments, the automatic-gain-control mechanism includes partial reflectors to allow self-lasing of the gain fiber if a pulsed signal is not present in order to saturate a gain of the gain fiber below a self-lasing threshold.

In some embodiments, the automatic-gain-control mechanism includes partially reflecting fiber Bragg gratings (FBGs) configured at an "off-signal" wavelength and placed at both ends of one or more amplification stages that include the gain fiber to form a cavity that allows self-lasing of the gain fiber if the pulsed seed signal is not present, such that those stages will begin to lase at the "off-signal" wavelength once a gain within those stages exceeds to losses of the "off-signal" wavelength leaking out the FBGs, but wherein the FBGs are substantially transparent to the signal wavelength of the signal pulses in order to saturate a gain of the gain fiber at a self-lasing threshold, where relaxation oscillations of such a configuration produce transients in the population inversion and gain, and multiple wavelengths with different self-lasing thresholds are used to damp out the relaxation oscillations.

Some embodiments further include a wavelength-conversion element configured to receive and wavelength convert the amplified output pulses using one or more nonlinear optical crystals.

In some embodiments, the present invention provides an apparatus that includes a gain fiber; means, as described and shown herein, for optically pumping the gain fiber using pump light; means for amplifying seed-signal pulses having a signal wavelength using the gain fiber to obtain amplified output pulses; and means for automatically limiting a gain of the gain fiber.

In some embodiments, the means for automatically limiting the gain includes means for forming a lossy resonant cavity that includes the gain fiber wherein a resonant wavelength of the cavity is different than the signal wavelength; and means for lasing the resonant cavity at the resonant wavelength only when a gain of the gain fiber exceeds a predetermined value. In some such embodiments, the means for forming the lossy resonant cavity uses one or more fiber Bragg gratings (FBGs) tuned to the resonant wavelength. Some embodiments further include means for passing the seed signal pulses through the one or more FBGs.

Some embodiments further include means for wavelength converting the amplified output pulses using nonlinear optical crystals, wherein the means for automatically limiting the gain includes means for coupling a CW signal to the gain fiber such that a level of inversion of the gain fiber is limited, thereby limiting the gain available to amplify pulses, but wherein the CW signal between the signal pulses, when output, is of such a low power that it does not result in significant wavelength conversion to the desired output wavelength in the nonlinear optical crystals, due to the limited power in the CW signal.

In some embodiments, the means for automatically limiting the gain includes means for coupling a background signal to the gain fiber, the background signal having a polarization different than the seed signal pulses and amplifying the background signal using the gain fiber to obtain amplified signal of the different polarization; and means for rejecting the amplified signal of the different polarization using a polarizer.

In some embodiments, a bandwidth of the seed signal is limited to a small fraction of a gain bandwidth of the gain fiber, and wherein the means for automatically limiting the gain includes means for coupling a background signal, having a first wavelength that is inside the gain bandwidth but outside the seed signal's bandwidth, to the gain fiber, which then limits the level of inversion in the gain fiber.

In some embodiments, a bandwidth of the seed signal is limited to a small fraction of a gain bandwidth of the gain fiber, and wherein the means for automatically limiting the gain includes means for coupling a background signal, having a first wavelength that is inside the gain bandwidth but outside the seed signal's bandwidth, wherein the gain fiber is ytterbium doped and has more than about 30 nanometers of gain bandwidth, but the seed signal operates at 10 nm or less of linewidth for the seed signal amplification, to the gain fiber, which then limits the level of inversion in the gain fiber; and means for rejecting the amplified first wavelength using a wavelength-sensitive bandpass filter.

In some embodiments, the means for automatically limiting the gain includes one or more partial reflectors that allow self-lasing of the gain fiber if a pulsed signal is not present in order to saturate a gain of the gain fiber below a self-lasing threshold.

In some embodiments, the means for automatically limiting the gain includes one or more partially reflecting fiber Bragg gratings (FBGs) configured at first wavelength and placed at both ends of one or more amplification stages that include the gain fiber to form a cavity that allows self-lasing of the gain fiber at the first wavelength if the pulsed seed signal is not present, such that those stages will begin to lase at the first wavelength once a gain within those stages exceeds to losses of the first wavelength leaking out the FBGs, but wherein the FBGs are substantially transparent to the signal wavelength of the signal pulses in order to saturate a gain of the gain fiber at a self-lasing threshold, where relaxation oscillations of such a configuration produce transients in the population inversion and gain, and multiple wavelengths with different self-lasing thresholds are used to damp out the relaxation oscillations.

Some embodiments further include means for wavelength converting the amplified output pulses using nonlinear optical crystals.

In some embodiments, various systems and concepts described in the related applications that were incorporated by reference above are combined with aspects of the gain-stabilized aspects of the present invention and form parts of some embodiments of the present invention.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method comprising:
   providing a first gain fiber;
   optically pumping the first gain fiber using pump light;
   amplifying seed-signal light pulses having a signal wavelength using the first gain fiber to obtain amplified light pulses;
   automatically limiting a gain of the first gain fiber by outputting light at non-signal wavelengths;
   providing at least a second gain fiber;
   coupling output light of the first gain fiber, including the amplified light pulses of the signal wavelength, into the second gain fiber;
   optically pumping the second gain fiber using pump light;
   further amplifying the output light of the first gain fiber using the second gain fiber to obtain further-amplified output light;
   automatically limiting a gain of the second gain fiber by outputting, from the second gain fiber, light at non-signal wavelengths; and
   filtering the output light of the second gain fiber to reject the light at the non-signal wavelengths from the output light of the second gain fiber in order to provide filtered further-amplified output light pulses at the signal wavelength.

2. The method of claim 1, wherein the automatically limiting of the gain of the first gain fiber includes:
forming a lossy resonant cavity that includes the first gain fiber wherein a resonant wavelength of the cavity is different than the signal wavelength; and
lasing the resonant cavity at the resonant wavelength only when a gain of the first gain fiber exceeds a predetermined value.

3. The method of claim 2, wherein the resonant cavity uses one or more fiber Bragg gratings (FBGs) tuned to the resonant wavelength.

4. The method of claim 3, further comprising passing the seed signal pulses through the one or more FBGs.

5. The method of claim 1, further comprising:
wavelength converting the amplified output pulses using nonlinear optical crystals, wherein the automatically limiting of the gain includes:
coupling a CW light signal into the second gain fiber such that a level of inversion of the second gain fiber is limited, thereby limiting the gain available to amplify pulses, but wherein the CW signal between the signal pulses, when output, is of such a low power that it does not result in significant wavelength conversion to the desired output wavelength in the nonlinear optical crystals, due to the limited power in the CW signal.

6. The method of claim 1, wherein the automatically limiting of the second gain includes:
coupling a background light signal to the second gain fiber, the background light signal having a polarization different than the seed signal pulses and amplifying the background light signal using the second gain fiber to obtain amplified signal of the different polarization; and
rejecting the amplified signal of the different polarization using a polarizer.

7. The method of claim 1, wherein a bandwidth of the seed signal is limited to a small fraction of a gain bandwidth of the first gain fiber, and wherein the automatically limiting of the gain includes:
coupling a background signal having an "off-signal" wavelength (i.e., one inside the gain bandwidth but outside the seed signal's bandwidth) to the first gain fiber, which then limits the level of inversion in the first gain fiber.

8. The method of claim 1, wherein a bandwidth of the seed signal is limited to a small fraction of a gain bandwidth of the first gain fiber, and wherein the automatically limiting of the gain includes:
coupling a background signal having an "off-signal" wavelength (i.e., one inside the gain bandwidth but outside the seed signal's bandwidth, wherein the first gain fiber is ytterbium doped and has more than about 30 nanometers of gain bandwidth, but the seed signal operates at 10 nm or less of linewidth for the seed signal amplification) to the first gain fiber, which then limits the level of inversion in the first gain fiber.

9. The method of claim 1, wherein the automatically limiting of the gain includes:
using partial reflectors to allow self-lasing of the first gain fiber if a pulsed signal is not present in order to saturate a gain of the first gain fiber below a self-lasing threshold.

10. A method comprising:
providing a gain fiber;
optically pumping the gain fiber using pump light;
amplifying seed-signal pulses having a signal wavelength using the gain fiber to obtain amplified output pulses;
automatically limiting a gain of the gain fiber; and
using partially reflecting fiber Bragg gratings (FBGs) configured at an "off-signal" wavelength and placed at both ends of one or more amplification stages that include the gain fiber to form a cavity that allows self-lasing of the gain fiber if the pulsed seed signal is not present, such that those stages will begin to lase at the "off-signal" wavelength once a gain within those stages exceeds to losses of the "off-signal" wavelength leaking out the FBGs, but wherein the FBGs are substantially transparent to the signal wavelength of the signal pulses in order to saturate a gain of the gain fiber at a self-lasing threshold, where relaxation oscillations of such a configuration produce transients in the population inversion and gain, and multiple wavelengths with different self-lasing thresholds are used to damp out the relaxation oscillations.

11. The method of claim 1, further comprising:
wavelength converting the amplified output pulses from the second gain fiber using nonlinear optical crystals.

12. The method of claim 2, further comprising:
wavelength converting the amplified output pulses from the first gain fiber using nonlinear optical crystals.

13. An apparatus comprising:
a first gain fiber;
a source of pump light coupled to the first gain fiber;
a source of seed-signal light pulses having a signal wavelength coupled to the first gain fiber, wherein the first gain fiber outputs amplified signal light pulses;
an automatic-gain-control mechanism configured to limit gain of the first gain fiber by outputting light at non-signal wavelengths;
at least a second gain fiber wherein the output light of the first gain fiber, including the amplified light pulses of the signal wavelength, is coupled into the second gain fiber;
a source of pump light coupled to the second gain fiber wherein the output light of the first gain fiber is further amplified in the second gain fiber to obtain further-amplified output light;
an automatic-gain-control mechanism configured to limit the gain of the second gain fiber by outputting light at non-signal wavelengths; and
a filter configured to reject the light at non-signal wavelengths from the output light of the second gain fiber in order to provide filtered further-amplified output light pulses at the signal wavelength.

14. The apparatus of claim 13, wherein the automatic-gain-control mechanism of the first gain fiber includes a lossy resonant cavity that includes the first gain fiber wherein a resonant wavelength of the cavity is different than the signal wavelength; wherein the resonant cavity lases at the resonant wavelength only when a gain of the first gain fiber exceeds a predetermined value.

15. The apparatus of claim 14, wherein the resonant cavity uses one or more fiber Bragg gratings (FBGs) tuned to the resonant wavelength.

16. The apparatus of claim 15, wherein the seed signal pulses pass through the one or more FBGs.

17. The apparatus of claim 13, further comprising:
a wavelength-converting device that includes one or more nonlinear optical crystals and is coupled to receive the amplified output pulses,
wherein the automatic-gain-control mechanism includes a connection that couples a CW signal to the second gain fiber such that a level of inversion of the second gain fiber is limited, thereby limiting the gain available to amplify pulses, but wherein the CW signal between the signal pulses, when output, is of such a low power that it does not result in significant wavelength conversion to the desired output wavelength in the nonlinear optical crystals, due to the limited power in the CW signal.

18. The apparatus of claim 13, wherein the automatic-gain-control mechanism of the second gain fiber includes:
means for coupling a background signal to the second gain fiber, the background signal having a polarization different than the seed signal pulses and amplifying the background signal using the second gain fiber to obtain amplified signal of the different polarization; and
means for rejecting the amplified signal of the different polarization using a polarizer.

19. The apparatus of claim 13, wherein a bandwidth of the seed signal is limited to a small fraction of a gain bandwidth of the first gain fiber, and wherein the automatic-gain-control mechanism includes:
means for coupling a background signal having an "off-signal" wavelength (i.e., one inside the gain bandwidth but outside the seed signal's bandwidth) to the first gain fiber, which then limits the level of inversion in the first gain fiber.

20. The apparatus of claim 13, wherein a bandwidth of the seed signal is limited to a small fraction of a gain bandwidth of the first gain fiber, and wherein the automatic-gain-control mechanism includes:
means for coupling a background signal having an "off-signal" wavelength (i.e., one inside the gain bandwidth but outside the seed signal's bandwidth, wherein the first gain fiber is ytterbium doped and has more than about 30 nanometers of gain bandwidth, but the seed signal operates at 10 nm or less of linewidth for the seed signal amplification) to the first gain fiber, which then limits the level of inversion in the first gain fiber.

21. The apparatus of claim 13, wherein the automatic-gain-control mechanism includes:
partial reflectors to allow self-lasing of the first gain fiber if a pulsed signal is not present in order to saturate a gain of the first gain fiber below a self-lasing threshold.

22. An apparatus comprising:
a gain fiber;
a source of pump light coupled to the gain fiber;
a source of seed-signal pulses having a signal wavelength coupled to the gain fiber, wherein the gain fiber outputs amplified signal pulses;
an automatic-gain-control mechanism configured to limit gain of the gain fiber; and
partially reflecting fiber Bragg gratings (FBGs) configured at an "off-signal" wavelength and placed at both ends of one or more amplification stages that include the gain fiber to form a cavity that allows self-lasing of the gain fiber if the pulsed seed signal is not present, such that those stages will begin to lase at the "off-signal" wavelength once a gain within those stages exceeds to losses of the "off-signal" wavelength leaking out the FBGs, but wherein the FBGs are substantially transparent to the signal wavelength of the signal pulses in order to saturate a gain of the gain fiber at a self-lasing threshold, where relaxation oscillations of such a configuration produce transients in the population inversion and gain, and multiple wavelengths with different self-lasing thresholds are used to damp out the relaxation oscillations.

23. The apparatus of claim 13, further comprising:
a wavelength-conversion element configured to receive and wavelength convert the amplified output light pulses from the second gain fiber using one or more nonlinear optical crystals.

24. An apparatus comprising:
a first gain fiber;
means for optically pumping the first gain fiber using pump light;
means for amplifying seed-signal light pulses having a signal wavelength using the first gain fiber to obtain amplified output light pulses;
means for automatically limiting a gain of the first gain fiber by outputting light at non-signal wavelengths;
at least a second gain fiber;
means for coupling output light of the first gain fiber, including the amplified light pulses of the signal wavelength, into the second gain fiber;
means for optically pumping the second gain fiber using pump light;
means for further amplifying output light of the first gain fiber using the second gain fiber to obtain further-amplified output light;
means for automatically limiting a gain of the second gain fiber by outputting light at non-signal wavelengths; and
means for filtering output light of the second gain fiber to reject the light at non-signal wavelengths from the output light of the second gain fiber in order to provide filtered further-amplified output light pulses at the signal wavelength.

25. The apparatus of claim 24, wherein the means for automatically limiting the gain of the first gain fiber includes:
means for forming a lossy resonant cavity that includes the first gain fiber wherein a resonant wavelength of the cavity is different than the signal wavelength; and
means for lasing the resonant cavity at the resonant wavelength only when a gain of the first gain fiber exceeds a predetermined value.

26. The apparatus of claim 25, wherein the means for forming the lossy resonant cavity uses one or more fiber Bragg gratings (FBGs) tuned to the resonant wavelength.

27. The apparatus of claim 26, further comprising means for passing the seed signal pulses through the one or more FBGs.

28. The apparatus of claim 24, further comprising:
means for wavelength converting the amplified output pulses using nonlinear optical crystals,
wherein the means for automatically limiting the gain includes:
means for coupling a CW light signal to the second gain fiber such that a level of inversion of the second gain fiber is limited, thereby limiting the gain available to amplify pulses, but wherein the CW signal between the signal pulses, when output, is of such a low power that it does not result in significant wavelength conversion to the desired output wavelength in the nonlinear optical crystals, due to the limited power in the CW signal.

29. The apparatus of claim 24, wherein the means for automatically limiting the gain of the second gain fiber includes:
means for coupling a background light signal to the second gain fiber, the background light signal having a polarization different than the seed signal pulses and amplifying the background light signal using the second gain fiber to obtain amplified signal of the different polarization; and means for rejecting the amplified signal of the different polarization using a polarizer.

30. The apparatus of claim 24, wherein a bandwidth of the seed signal is limited to a small fraction of a gain bandwidth of the first gain fiber, and wherein the means for automatically limiting the gain includes:
means for coupling a background signal, having a first wavelength that is inside the gain bandwidth but outside the seed signal's bandwidth, to the first gain fiber, which then limits the level of inversion in the first gain fiber.

31. The apparatus of claim 24, wherein a bandwidth of the seed signal is limited to a small fraction of a gain bandwidth of the first gain fiber, and wherein the means for automatically limiting the gain includes:
means for coupling a background signal, having a first wavelength that is inside the gain bandwidth but outside the seed signal's bandwidth, wherein the first gain fiber is ytterbium doped and has more than about 30 nanometers of gain bandwidth, but the seed signal operates at 10 nm or less of linewidth for the seed signal amplification, to the first gain fiber, which then limits the level of inversion in the first gain fiber.

32. The apparatus of claim 24, wherein the means for automatically limiting the gain includes:
one or more partial reflectors that allow self-lasing of the first gain fiber if a pulsed signal is not present in order to saturate a gain of the first gain fiber below a self-lasing threshold.

33. An apparatus comprising:
a gain fiber;
means for optically pumping the gain fiber using pump light;
means for amplifying seed-signal pulses having a signal wavelength using the gain fiber to obtain amplified output pulses;
means for automatically limiting a gain of the gain fiber; and
one or more partially reflecting fiber Bragg gratings (FBGs) configured at first wavelength and placed at both ends of one or more amplification stages that include the gain fiber to form a cavity that allows self-lasing of the gain fiber at the first wavelength if the pulsed seed signal is not present, such that those stages will begin to lase at the first wavelength once a gain within those stages exceeds to losses of the first wavelength leaking out the FBGs, but wherein the FBGs are substantially transparent to the signal wavelength of the signal pulses in order to saturate a gain of the gain fiber at a self-lasing threshold, where relaxation oscillations of such a configuration produce transients in the population inversion and gain, and multiple wavelengths with different self-lasing thresholds are used to damp out the relaxation oscillations.

34. The apparatus of claim 24, further comprising:
means for wavelength converting the amplified output light pulses from the second gain fiber using nonlinear optical crystals.

35. The method of claim 1, wherein a bandwidth of the seed signal is limited to a small fraction of a gain bandwidth of the first gain fiber, and wherein the automatically limiting of the gain includes:
coupling a background light signal having an "off-signal" wavelength to the first gain fiber, wherein the "off-signal" wavelength is inside the gain bandwidth but outside the seed signal's bandwidth, and wherein the first gain fiber is ytterbium doped and has more than about 30 nanometers of gain bandwidth, but the seed signal operates at 10 nanometers or less of linewidth for the seed signal amplification, which then limits the level of inversion in the first gain fiber; and
rejecting the amplified "off-signal" wavelength using a dichroic filter.

36. The apparatus of claim 13, wherein a bandwidth of the seed signal is limited to a small fraction of a gain bandwidth of the first gain fiber, and wherein the automatic-gain-control mechanism includes:
means for coupling a background light signal having an "off-signal" wavelength to the first gain fiber, wherein the "off-signal" wavelength is inside the gain bandwidth but outside the seed signal's bandwidth, and wherein the first gain fiber is ytterbium doped and has more than about 30 nanometers of gain bandwidth, but the seed signal operates at 10 nanometers or less of linewidth for the seed signal amplification, which then limits the level of inversion in the first gain fiber; and
dichroic means for rejecting the amplified "off-signal" wavelength.

37. The apparatus of claim 24, wherein a bandwidth of the seed signal is limited to a small fraction of a gain bandwidth of the first gain fiber, and wherein the means for automatically limiting the gain includes:
means for coupling a background signal, having a first wavelength that is inside the gain bandwidth but outside the seed signal's bandwidth, wherein the first gain fiber is ytterbium doped and has more than about 30 nanometers of gain bandwidth, but the seed signal operates at 10 nanometers or less of linewidth for the seed signal amplification, to the first gain fiber, which then limits the level of inversion in the first gain fiber; and
dichroic means for rejecting the amplified first wavelength.

38. The method of claim 1, further comprises:
using light wavelengths in the range of approximately 1020 to 1040 nm as the non-signal light; and
using a light wavelength of approximately 1060 nm as the signal light.

39. The apparatus of claim 13, wherein
the non-signal light wavelengths are in the range of approximately 1020 to 1040 nm; and
the signal light wavelength is approximately 1060 nm.

\* \* \* \* \*